(12) United States Patent
Tofighbakhsh et al.

(10) Patent No.: US 10,992,554 B2
(45) Date of Patent: Apr. 27, 2021

(54) INTELLIGENT DATA ANALYTICS COLLECTORS

(71) Applicant: AT&T Intellectual Property I, L.P., Atlanta, GA (US)

(72) Inventors: Mostafa Tofighbakhsh, Cupertino, CA (US); Bryan Sullivan, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 210 days.

(21) Appl. No.: 16/213,439

(22) Filed: Dec. 7, 2018

(65) Prior Publication Data

US 2020/0186449 A1   Jun. 11, 2020

(51) Int. Cl.
*H04L 12/26* (2006.01)
(52) U.S. Cl.
CPC .................................. *H04L 43/04* (2013.01)
(58) Field of Classification Search
USPC ........................................................ 709/224
See application file for complete search history.

(56) References Cited

U.S. PATENT DOCUMENTS

| | | | |
|---|---|---|---|
| 9,503,228 B2 | 11/2016 | Subhedar et al. | |
| 9,588,815 B1 | 3/2017 | Mistry et al. | |
| 9,838,286 B2 | 12/2017 | Zhang et al. | |
| 9,858,167 B2 | 1/2018 | Neiger et al. | |
| 10,009,287 B2 | 6/2018 | Djukic et al. | |
| 10,027,530 B2 | 7/2018 | Mahkonen et al. | |
| 2016/0062746 A1 | 3/2016 | Chiosi et al. | |
| 2016/0094641 A1* | 3/2016 | Rahman | G06F 9/5077 718/1 |
| 2017/0076105 A1* | 3/2017 | Paulovicks | G06F 16/10 |
| 2017/0078157 A1* | 3/2017 | Zhang | G06F 16/29 |
| 2017/0244614 A1 | 8/2017 | Wu et al. | |
| 2017/0302505 A1 | 10/2017 | Zafer et al. | |
| 2018/0034685 A1 | 2/2018 | Naous | |
| 2018/0048525 A1 | 2/2018 | Karasaridis et al. | |
| 2018/0063018 A1 | 3/2018 | Bosch et al. | |
| 2018/0077033 A1 | 3/2018 | Tofighbakhsh et al. | |
| 2018/0131578 A1 | 5/2018 | Cui et al. | |
| 2018/0278496 A1* | 9/2018 | Kulshreshtha | H04L 41/145 |

* cited by examiner

*Primary Examiner* — Hermon Asres
(74) *Attorney, Agent, or Firm* — Guntin & Gust, PLC; Kenneth Kwan

(57) ABSTRACT

Aspects of the subject disclosure may include, for example, generating a instruction set according to a data analytics collection strategy and identifying first and second network devices adapted to perform first and second types of network functions, respectively, within a communications network, wherein the first and second types of network functions are different. First and second collectors are instantiated in association with the first and second network devices, respectively, and the instruction set is provided to each of the first and second collectors. The first and second collectors are adapted to autonomously execute first and second segments of the instruction set according to the first and second types of network function to obtain first and second collection results, respectively, wherein network analytic functions are adapted to process the first and second collection results. Other embodiments are disclosed.

20 Claims, 11 Drawing Sheets

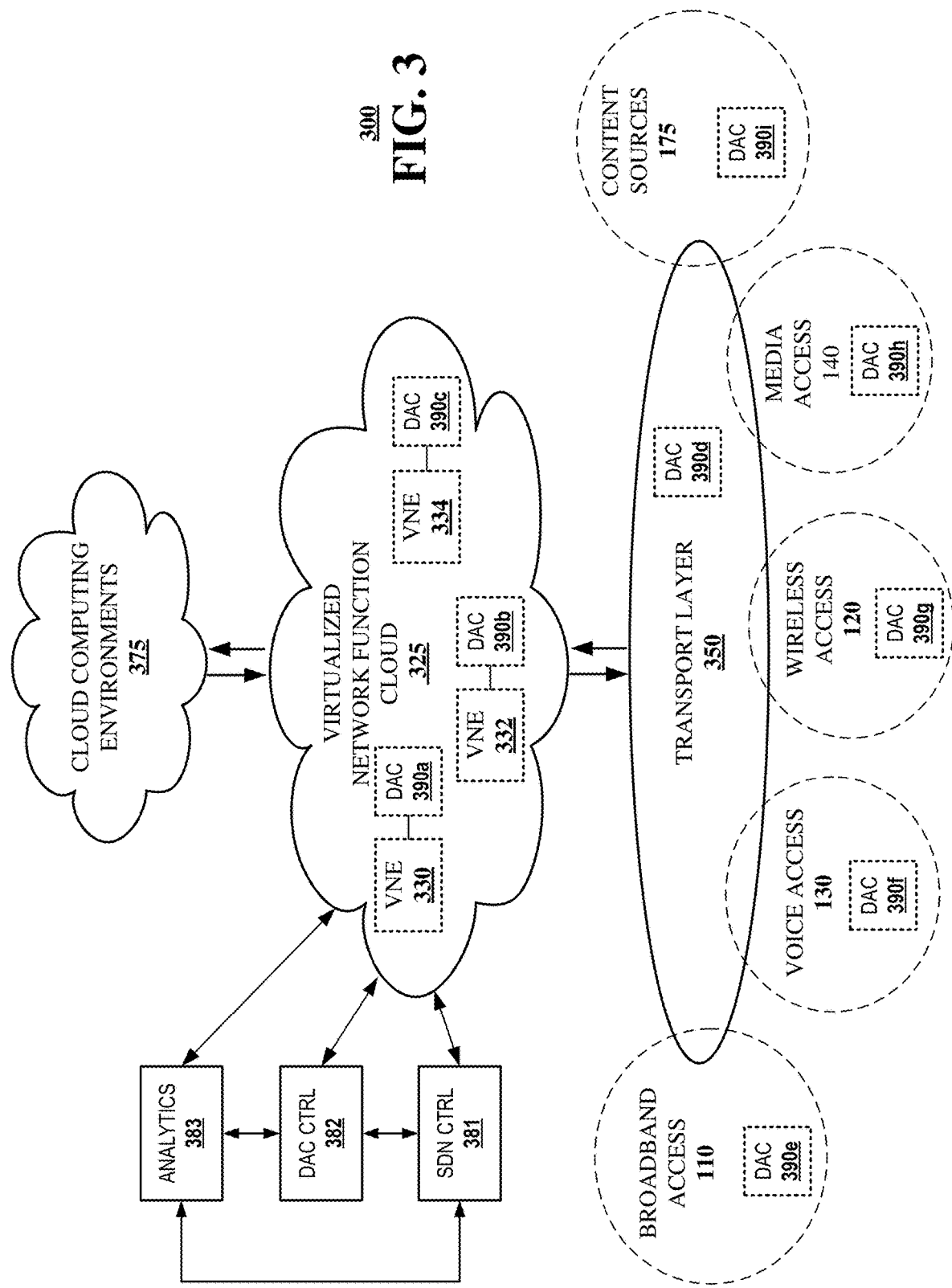

INTELLIGENT DATA ANALYTICS COLLECTORS

FIELD OF THE DISCLOSURE

The subject disclosure relates to intelligent data analytics collectors.

BACKGROUND

Network resiliency is of critical importance to network operators, service providers, and associated end users. Everyone expects "always on" network connectivity and any down time can result in lost revenue, opportunities, etc. As such, various operations, administration, and maintenance (OAM) instrumentation techniques are available at one or more network levels. Operators intently monitor OAM at the different network levels. Use cases include network monitoring, network security monitoring, Network optimization, business process optimization.

Network monitoring products are available to collect data from a network, analyze it, and present actionable information to a network manager. Example monitoring tools include packet-monitors, network flow collectors, and device-metric monitors. The process of collecting and analyzing network data often includes data obtained by proprietary methods of various equipment vendors. Ideally, each vendor would provide the necessary data, at the right time, the appropriate scale and in the right format. Unfortunately, this is often not the case. The various vendor monitoring techniques produce metadata, that when processed at scale can burden operation of the network.

Providers of communication services are currently implementing network function virtualization (NFV), in which network functions are ported to virtualized environments to enable a migration of services to a cloud-based infrastructure. In some implementations, a software defined network (SDN) controller supports virtualized network functions. Accordingly, network monitoring products can be used in physical, virtualized or combinations of physical and virtualized network applications.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
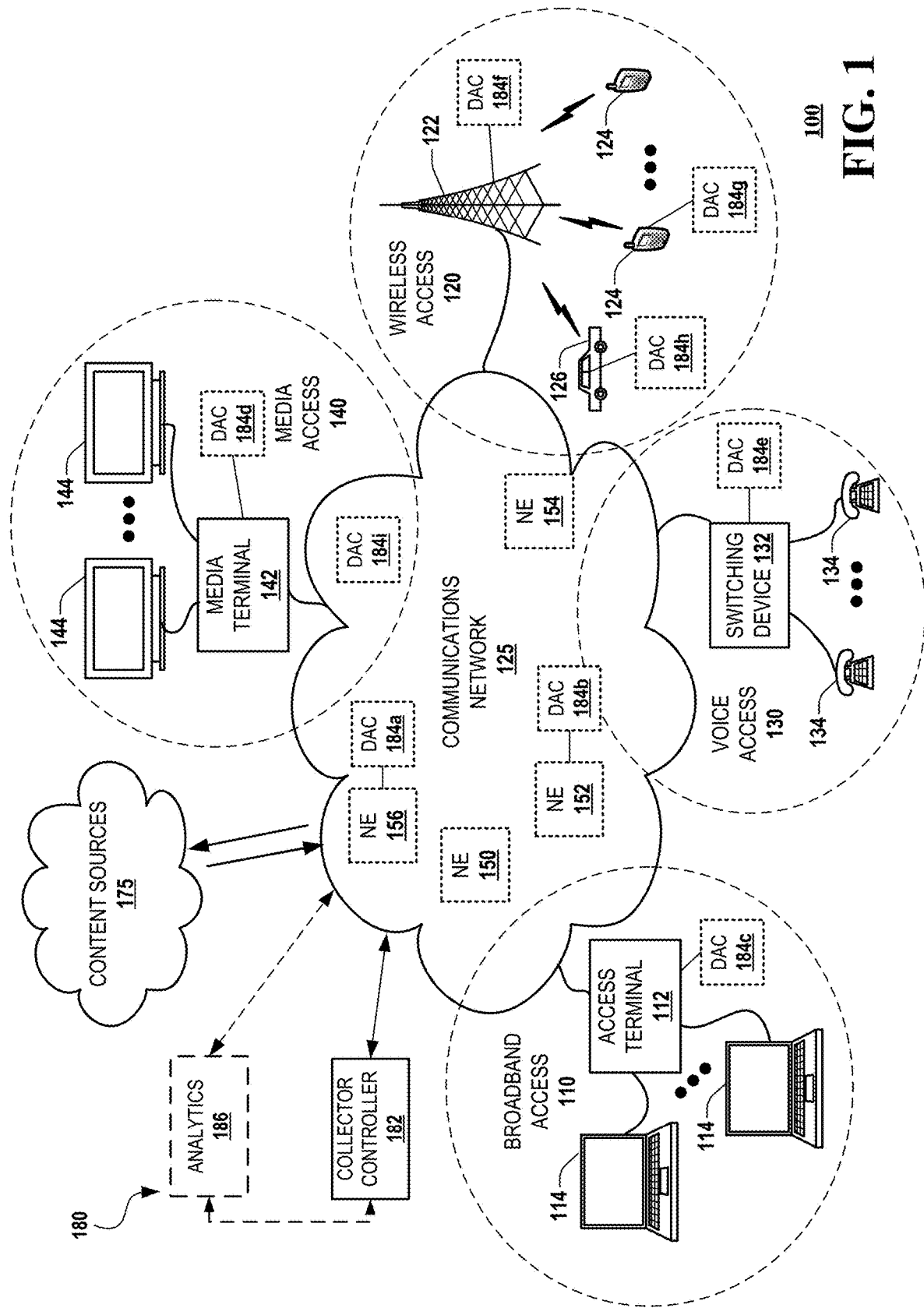
FIG. 1 is a block diagram illustrating an exemplary, non-limiting embodiment of a communications network including a data analytics capability in accordance with various aspects described herein.

The subject disclosure describes, among other things, illustrative embodiments for an infrastructure and process that implements a customizable data collection strategy among a variety of different devices and/or subsystems of a network. In particular, data analytics functionality is implemented by way of a common instruction set that provided to all of the different network devices and/or subsystems for which data is to be collected during a data collection interval. According to the infrastructure, the same instructions are implemented differently, according to the target device and/or subsystem. Other embodiments are described in the subject disclosure.

One or more aspects of the subject disclosure include a process that includes determining, by a processing system including a processor, a data analytics collection strategy. A common machine-readable instruction set is generated by the processing system a according to the data analytics collection strategy. A first network device is identified by the processing system and adapted to perform a first type of network function within a communications network. Likewise, a second network device is also adapted to perform a second type of network function within the communications network, wherein the first type of network function and the second type of network function are different. A first analytics collection device in association with the first network device is instantiated by the processing system. Likewise, a second analytics collection device in association with the second network device is also instantiated by the processing system. The common machine-readable instruction set is forwarded by the processing system to the first analytics collection device and to the second analytics collection device according to a first collection period. The first analytics collection device is adapted to autonomously execute a first group of instructions of the common machine-readable instruction set according to the first type of network function to obtain first collection results during the first collection period. Likewise, the second analytics collection device is also adapted to autonomously execute a second group of instructions of the common machine-readable instruction set according to the second type of network function to obtain second collection results during the first collection period. Network analytic functions are adapted to process the first collection results and the second collection results according to the data analytics collection strategy.

One or more aspects of the subject disclosure include a non-transitory, machine-readable medium that includes executable instructions that, when executed by a processing system including a processor, facilitate performance of operations. The operations include identifying a data analytics strategy and generating a common instruction set according to the data analytics strategy. A first network device adapted to perform a first type of network function within a communications network is identified. Likewise, a second network device adapted to perform a second type of network function within the communications network is also identified, wherein the first type of network function differs from the second type of network function. A first analytics collector is instantiated in association with the first network device and a second analytics collector in association with the second network device. The common instruction set is provided to the first analytics collector and to the second analytics collector, wherein the first analytics collector is adapted to autonomously execute a first subset of the common instruction set according to the first type of network function to obtain first collection results and the second analytics collector is adapted to autonomously execute a second subset of the common instruction set according to the second type of network function to obtain second collection results. Network analytic functions are adapted to process the first collection results and the second collection results according to the data analytics strategy.

One or more aspects of the subject disclosure include a device having a processing system that includes a processor and a memory that stores executable instructions. The executable instructions, when executed by the processing system, facilitate performance of operations. The operations include determining a data analytics strategy and generating an instruction set according to the data analytics strategy. A first network device adapted to perform a first type of network function is identified. Likewise, a second network device adapted to perform a second type of network function is also identified, wherein the first type of network function differs from the second type of network function. A first collector is provided in association with the first network device and a second collector is also provided in association with the second network device. The instruction set is provided to the first collector and to the second collector, wherein the first collector is adapted to execute a first segment of the instruction set according to the first type of network function to obtain first collection results and the second collector is adapted to execute a second segment of the instruction set according to the second type of network function to obtain second collection results. A network analytic function is adapted to process the first collection results and the second collection results according to the data analytics strategy.

The present disclosure broadly discloses devices, computer-readable media and methods for instantiating and/or adapting virtual machines of a network function virtualization infrastructure to perform tasks in accordance with a common set of instructions to collect network analytic in support of functional network analytics in a telecommunications network. For instance, examples of the present disclosure provide a platform to instruct a group of data analytics collectors according to a common instruction set to perform data analytics collection tasks in association with network devices in support of network analytics functions in a telecommunication network. In particular, examples of the present disclosure provide a robust environment for emerging and scalable deep observability that is structured in a unified and collaborative abstraction model. In one example, a data analytics collection (DAC) strategy provides a unified instruction set to enable a network analytics application (or an administrator) to instrument DAC devices to collect network control plane data in association with target network devices, to correlate or to otherwise process the control plane data, and to transport results to collection devices or to a network analytics application in a meaningful way. For instance, a network analytics application may generate a set of DAC instructions to configure different DAC collectors to collect control plan data in association with target network-based devices and in at least some applications, to perform real-time analytics that are dynamic and programmable. In one example, the DAC collectors and/or network-based devices can include one or more of configurable virtual machines (VMs), general purpose smart network interface cards (NICs), routers, switches, network edge devices, mobile communications devices, radios, radio controllers, network accessible devices, that in at least some instances participate in machine-type or machine-to-machine (M2M) communications, e.g., according to an Internet of Things (IoT) scenario, compute or storage environments, and so forth.

Big data approaches to network analytics may lack real-time capabilities, e.g., due to the sheer volume of data. Such approaches may also lack scalability, e.g., as a result of being customized for specific applications. In contrast, examples of the present disclosure provide a unified approach to network analytics to instruct and configure network devices to perform diverse network analytics functions in real time. For example, in accordance with the present disclosure, network analytics applications can use a common set of instructions promulgated to the same or different devices to implement DAC operations in association with the same or different network devices that operate according to the same or different network functions.

The common set of instructions can be implemented by different devices or similar devices of different vendors, according to an abstraction interface, e.g., an application programming interface (API), to define a DAC function, e.g., a set of instructions including a series of parameters, conditions, actions, etc., at a high level, and compile the high level set of instructions into a DAC instruction set that provides "n" instruction categories. For instance, the categories include instructions for input flow data acquisition, e.g., the types of control plane data desired, how to collect the data, e.g., divert the data, make a copy of the data, etc., the target network devices, or instantiate, enlist or otherwise utilize other "agents," to participate in the collection of network information in support of network analytics functions, and so forth. The categories can also include instructions to configure network devices to process the collected control plane data, instructions on how the processing is to be adapted in response to certain conditions, and instructions on how results are distributed or abstracted for consumption by the requesting network analytics application or another recipient device.

In one example, a network analytics application defines a set of instructions via a functional network analytics (FNA) platform API. The instructions are compiled into a FNA platform-based instruction set (also referred to herein as a "set of FNA instructions") that is understandable to network devices/agents that are FNA platform enabled. The network analytics application then selects one or more available agents for execution of the FNA platform-based instruction set. For example, the FNA platform-based instruction set may include a device plug-in for configuring one or more FNA platform-enabled agents. The agent(s) is/are then responsible for execution of the FNA platform-based instruction set into actionable triggers. In one example, the agent(s) may select one or more "worker" devices to execute specific tasks as part of the FNA-platform based instruction set. In one example, the "worker" devices may be selected based upon the particular capabilities, locations, and access to different types of control plane data which may be called for by the FNA platform-based instruction set. For instance, an agent may select a first network device as a "worker" to collect a first type of control plane data and a second network device as a "worker" to collect a second type of control plane data. The first and second network devices may then forward the first and second types of control plane data to the agent, where the agent may then correlate and otherwise process the first and second types of control plane data as part of an overall network analytics function defined in the FNA platform-based instruction set. Thus, in one example, the worker device(s) are configured with specific skills for the durations of the respective tasks by the agent(s). In one example, the agent(s) are open interface and their performance is managed via the FNA platform-based instruction set. In one example, the worker devices may also include virtual machines (VMs), e.g., operating on a host devices/network function virtualization infrastructure (NFVI). In one example, the host devices may primarily be configured to provide VMs for various functions, or may include devices which are primarily dedicated to performing a particular network function, e.g., a router, switch, etc., but which may have a portion of the hardware resources set aside for being configured and reconfigured as VM(s).

In one example, the FNA platform provides a library with various network analytics function primitives. The primitives may have boundaries that are limited in scope (such as a primitives for an adder, a subtraction counter, a jitter sensor, an inter-arrival average rate measurement, a round trip delay measurement, etc.) but which can be made dynamic through instructions entered via the API. In one example, the library of primitives may grow as it is enhanced through repeated creation of FNA platform-based instruction sets. In addition, the capabilities of agents and workers may be enhanced within the context of performance/execution of one or more tasks in accordance with a particular FNA platform-based instruction set. For instance, the FNA platform-based instruction set may provide instructions to perform differently depending upon various triggers/conditions which may be encountered. Thus, the agent and/or the worker devices may adapt to the changing network conditions.

Examples of the present disclosure may operate in a highly scalable environment, such as a telecommunication network data center, with a large number of dedicated servers, switches, storage devices, smart NICs and so forth that are enabled with computing and memory hardware for execution of algorithms in a trusted execution environment. In one example, a hypervisor provides security to authenticate the agent(s) requesting the services of worker devices, e.g., virtual machines (VMs). The benefits extend to support large number of vertical markets including automation, and control over a large number of resources that are unified in skills and capabilities and with programmability across various servers, storage devices, and networking equipment. Examples of the present disclosure therefore enable real-time and collaborative network analytics. The devices utilized in examples of the present disclosure may also capitalize on open technologies such as hypervisors, operating systems, communication protocols, and the like, as well as the present open FNA platform as described herein. These and other aspects of the present disclosure are discussed in greater detail below in connection with the examples of FIGS. 1-4.

Referring now to FIG. 1, a block diagram is shown illustrating an example, non-limiting embodiment of a communications network 100 in accordance with various aspects described herein. For example, communications network 100 can facilitate in whole or in part a distributed analytics collection system 180 adapted to collect information related to operation and/or maintenance of all or one or more portions, segments and/or devices of the communications network 100. In particular, a communications network 125 is presented for providing broadband access 110 to a number of data terminals 114 via access terminal 112, wireless access 120 to a number of mobile devices 124 and vehicle 126 via base station or access point 122, voice access 130 to a number of telephony devices 134, via switching device 132 and/or media access 140 to a number of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a number of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, the distributed analytics collection system 180 includes a collector controller 182 and one or more collector devices 184a-184i, generally 184. The collector devices 184 can be positioned at predetermined locations within the network 100. Locations can include physical locations, e.g., at a data center, at a base transceiver station, and/or at any other network device, including without limitation network nodes and network-enable devices, such as end user devices and/or terminals. Alternatively or in addition, the collector devices 184 can be positioned at a predetermined network location according to an architecture of the network 100.

According to the illustrative embodiment, collector devices 184a, 184b are respectively configured in association with, within and/or adjunct to network elements 156, 152. Other data collectors 184i are configured within the communications network 125, but not configured in association with, within and/or adjunct to any particular network element. For example, network elements 150, 154 are not associated with and/or adjunct to any particular collection devices 184. It is understood that in at least some embodiments, only a subset of network elements are monitored. Alternatively or in addition, The collector devices 184 are adapted to obtain, gather and/or otherwise collect information. According to a communication network application, the collected information can include information obtained from monitoring of one or more of equipment or device parameters, environmental parameters, control plane or signaling messaging and data plane or data content. In general, network traffic can be abstracted into data traffic and signaling traffic. The data traffic can be referred to as occurring within a data plane; whereas, signaling traffic that supports the exchange of data traffic can be referred to as occurring within a control plane. Equipment device parameters can include, without limitation, power, e.g., power consumption, and/or capacity, radio transmitted and/or received signal power, processing, e.g., processing utilization and/or capacity, and port utilization and/or capacity. Environmental parameters can include, without limitation, thermal load and/or ambient temperature. Control plane or signaling messaging can include, without limitation, error rates, error correction, jitter, delay, e.g., packet delay, round trip delay, quality of service (QoS) and priority status. Data plane or data messaging can include, without limitation, data type, e.g., voice, video, file transfer, message service, and data size.

In some embodiments, the network includes an analytics processor 186 (shown in phantom). In some embodiments, the analytics processor 186 is hosted on a server platform that may be collocated with the collector controller 182, or accessible via a network connection, e.g., within the cloud. The analytics processor 186 can be in communication with the collector controller 182. In at least some embodiments, the analytics processor 186 can be in further communication with one or more of the collector devices 184.

Figure 2A:
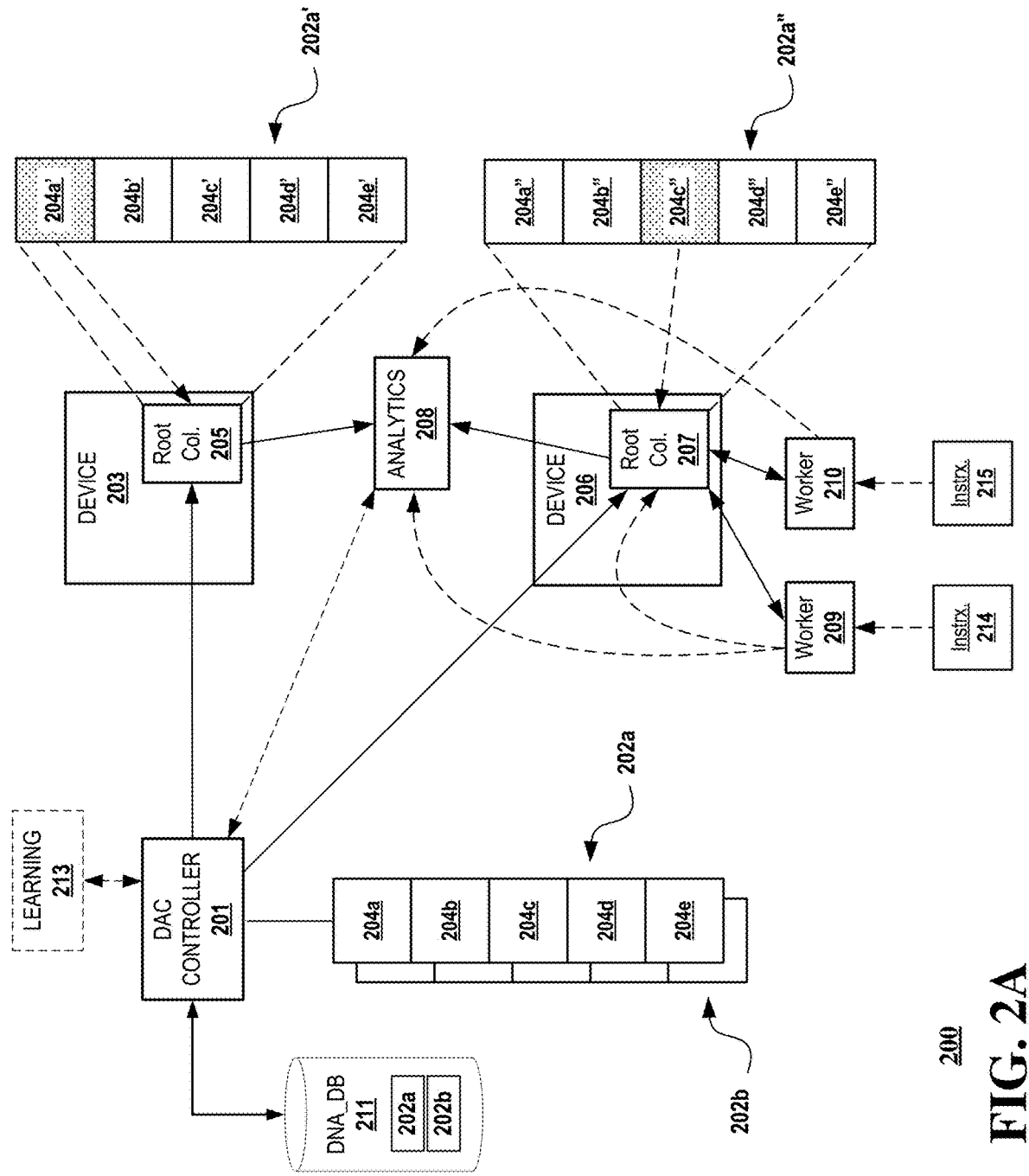
FIG. 2A is a block diagram illustrating an example, non-limiting embodiment of a data analytics collecting system in accordance with various aspects described herein.

FIG. 2A is a block diagram illustrating an example data analytics collection system 200 in accordance with various aspects described herein. The collection system 200 includes a data analytics controller 201 in communication with first and second root collectors 205, 207. The first root collector 205 is associated with a first device 203 and the second root collector 207 is associated with a second device 206. One or more of the devices 203, 206 can be a host device, such as might be provided according to a network function virtualization infrastructure (NFVI). In such instances, one or more of the root collectors 205, 207 can be implemented as virtual machines hosted by the NFVI 203, 206, e.g., according to a software defined network (SDN) architecture. Alternatively or in addition, one or more of the devices 203, 206 can be physical device, such as a host processor that supports operation of the root collector 205, 207, or a function added to or otherwise implemented within the devices 203, 206. In other applications, one or more of the devices 203, 206 can be a network element, such as a router, a switch, a gateway, a core network element, a network capable end user device, or more generally, any of the various network and/or end user devices disclosed herein. It is envisioned that for a particular device 203, say a router, the root collector 205 may be implemented as a set of functions inside a control plane of the device 203. Alternatively or in addition, the instructions may be adjunct to the device, e.g., in a common virtual machine of a SDN architecture, or as an independent network collection device, e.g., an independent physical node.

The data analytics controller 201 generates a computer-readable instruction set 202a and forwards, pushes, injects or otherwise provides the instruction set 202a to each of the root collectors 205, 207. In general, the instruction set 202 includes a common set of instructions that are disseminated by the data analytics controller 201 to an arbitrary number of root collectors. The same instruction set is disseminated without particular regard to functionality of a particular target device and/or a particular vendor or source of the target device. Namely, the same instruction set is sent to a network router of a first vendor, a network router of a second vendor, a first switch of a first vendor, a second switch of a second vendor, a first mobile terminal of a first vendor, a second vendor of a second mobile terminal and so on. Despite this common set of instructions being applied to all root data collectors, regardless of target functionality or source, execution of the instruction set causes the recipient root collector to respond or otherwise react differently according to the particular target with which the root collector is affiliated.

The same instruction set can facilitate synchronization by injecting the same instructions to different collectors 205, 207 at the same time. The instructions, once injected by the controller 201, can executed autonomously by each of the root collectors 205, 207. Each collector autonomously executing the common instruction set can exhibit synchronized behavior. For example, execution of the instructions may result in updates according to some time interval or some instruction in the instructions that results in a start of execution of a portion of a function in response to an event, e.g., a trigger, or at certain time of day. Similarly, the collectors can be adapted to execute a different function, or a different part of the injected common instruction according to a condition, such a certain load/condition.

In this regard, the instruction set 202a can be analogized to "DNA," whereas the root collectors 205, 207 and/or the devices 203, 206 are analogous to cells of different parts of a body. It is generally understood that all cells in a multicellular organism contain the same DNA. Information carried by DNA is held in sequences of pieces of DNA called genes. The DNA accumulates molecular changes that educate the cell about its eventual role. Just as cells of a foot and cells of an eye receive the same DNA, different portions of the DNA are responsible for determining whether a particular cell functions as part of a foot or part of an eye. Likewise, the same instruction set 202a, i.e., DNA, can be provided to all root collectors 205, 207, i.e., cells, whereas different segments 204 of the instruction set 202a, i.e., genes, are operative according to a location and/or function of a target of the root collector 205, 207.

In at least some applications, the same instruction set 202a is forwarded to both of the root collectors 205, without regard to roles, applications, types, and/or vendors of the devices 203, 206. According to the illustrative example, the instruction set 202a includes a number of different segments, partitions, sections, and/or modules 204a, 204b, 204c, 204d, 204e, referred to collectively as segments 204. As a consequence of the forwarding of the same instruction set 202a, the first root collector 205 is injected or otherwise provided with a first copy of the instruction set 202a' and the second root collector 207 is injected or otherwise provided with a second copy of the instruction set 202a". According to the illustration, each copy of the instruction set 202a', 202a" includes copies of all of the same modules 204 provided by the data analytics controller 201.

It is envisioned that the same and/or different segments 204', 204" of the injected copies of the instruction sets 202a', 202a" may be operative according to the first and second root collectors 205, 207. Precisely which segments 204 are operative in or on a particular root collector 205, 207 can be a consequence of one or more of a function performed by the particular root collector 205, 207, a type of machine hosting the particular root collector 205, 207, a vendor of the particular root collector 205, 207, a function, type and/or vendor of the particular device 203, 206.

According to the illustrative embodiment, a first segment 204a' of the first copy of the instruction set 202a' is operative within the first root collector 205. The other segments, namely segments 204b', 204c', 204d', 204e', are not operative according to the illustrative example. Likewise, a third segment 204c" of the second copy of the instruction set 202a" is operative within the second root collector 207, while the other segments, namely segments 204a", 204b", 204d", 204e", are not operative according to the illustrative example. It is understood that more than one segments 204', 204" may be operative at any given time and there may be partial and/or complete overlap of the particular groups of operative segments 204', 204" implemented by the first and second root collectors 207.

Different root collectors 205, 207 are provided at different targeted network device 203, 206 and/or different network locations. These target devices are configured, adapted or otherwise responsible for implementing a particular functionality by way of the common instruction set 202. The different root collectors 205, 207 are driven by the same instructions during the same collection interval. The same or common instruction sets 202 passed to the targeted collectors 205, 207 to enable the collection of the right amount of information, in the format, with the right filtering, and to pass collected information upward, e.g., to a functional network analytics (FNA) engine 208. What determines the "right" amount of information, the "right" format and the "right" filtering can depend upon one or more of the type of target device 203, network conditions, triggering events, and the like.

By way of example, operative segments 204 of the common instruction set can cause the root collectors 205, 207 to implement one or more of capturing states, e.g., of a device and/or segment of the network, creating counters, adding some values, measuring other values. For example, the instruction set can inject functionality into the root collector to measure a power level of a radio at a certain temperature or certain environmental condition as may be described within the common instruction set. In another example, execution of the common instruction set can cause the collector to start measuring inter arrival time of packets or buffer overload responsive to a determination that the network is congested at a certain point.

It is envisioned that in at least some embodiments, the instruction segments 204 can be classified, identified and/or otherwise arranged into groups that are applicable to particular devices and/or applications. Such an arrangement provides some measure of distinguishability among the different types of segments 204. For example, a segment can be associated with a machine-readable tag or identification (ID), e.g., an alphanumeric code. Such codes can be dictated and/or determined according to an industry standardization process. Thus, while some groups, e.g., some types or IDs might be applicable to routers, or switches, other groups, types or IDs might be relevant to end user devices. Accordingly, each different type of device can be configured to interpret and/or otherwise implement only those segments that are applicable to the particular device and/or function. Accordingly, each device 203, 206 receives the same instruction set 202a, but interprets and/or otherwise implements only those segments that are applicable to the type and/or function of the associated device 203, 206. In at least some embodiments, other segments 204 of the common instruction set 202a that would not apply to the type of device or function can be essentially ignored.

Each instruction set 202 operates in a collection interval. Beneficially, the instruction set 202 allows collector instructions can change for different collection intervals. Namely, the SDC defines what the DNA should do in the next interval. Intervals allow collectors to operate in a harmonized and/or synchronous manner. In some embodiments, the DAC controller 201 generates a first instruction set 202a and provides the first instruction set 202a to the root collectors 205, 207 according to a first data analytics collection period or interval. Each of the root collectors 205, 207 having received the same instruction set 202a, enacts to implement the instruction set 202a according to the device 203, 206 and/or applicable function. The root collectors 205, 207 proceed to collect and in at least some instances, pre-process and/or analyze collected results according to the applicable segments 204 of the instruction set 202a. Implementation of the instruction set 202a produces sets of data analytics collection results at each of the root collectors 207. The root collectors 207 can be adapted to forward and/or otherwise provide their respective results to a predetermined destination, such as a network address of a data analytics processor 208. The data analytics processor 208, in turn, can further process and/or interpret the data analytics collection results from among the different root collectors 205, 207.

The DAC controller 201 can be adapted to generate a second, subsequent instruction set 202b and provide the second instruction set 202b to the root collectors 205, 207 according to a second data analytics collection period or interval. Each of the root collectors 205, 207 having received the same second instruction set 202b, enacts to implement the second instruction set 202b according to the device 203, 206 and/or applicable function. The root collectors 205, 207 proceed to collect and in at least some instances, pre-process and/or analyze collected results according to the applicable segments of the second instruction set 202b. Implementation of the second instruction set 202b produces second sets of data analytics collection results at each of the root collectors 207. The root collectors 207 can be adapted to forward and/or otherwise provide their respective results as before to a predetermined destination, such as the data analytics processor 208. The data analytics processor 208, in turn, can further process and/or interpret the data analytics collection results obtained during the second collection period from among the root collectors 205, 207.

In some embodiments, the first and second instruction sets 202a, 202b can be independent, e.g., as in entirely separate data analytic missions implemented during different data collection periods. The data collection periods can be sequential and/or overlap partially or entirely. In some embodiments, the first instruction set 202a can be provided to a first set of root collectors 205, 207, whereas the second instruction set 202b can be provided to a second set of root collectors that may be the same or different than the first set. In at least some embodiments, a data analytics collection process includes identifying one or more of the number, location or type of root collector. Providing for a selection of root collectors as well as the particular instruction set implemented thereby, offers flexibility and adaptability to overall data analytics functionality.

In some embodiments, the second instruction set 202b represents a refinement, improvement, enhancement and/or extension of the first instruction set 202a. For example, data analytic collection results obtained in response to execution of the first instruction set 202a by the first group of root collectors 205, 207 can be analyzed and/or interpreted. The second instruction set 202b can be generated based on a result of the analysis and/or interpretation and forwarded to the same and/or different group of root collectors 205, 207 to obtain further collection results. Collected data can be shared by using metadata. Details about the network can be learned from the metadata provided by collectors. It is envisioned that such learning may result in a conclusion that adjustments are necessary or would be at least beneficial. For example, it may be determined that a running average interval be adjusted from 1 minute to 1 minutes, or 1 second to 2 seconds. Such adjustments can be implemented by injecting a new instruction set adapted to implement the adjustments.

The illustrative embodiment includes an optional machine learning processor 213 (shown in phantom). The machine learning processor 213 can be in communication with the data analytics processor 208, to obtain data analytics processing results. The machine learning processor 213 can evaluate one or more aspects of the results, such as the size of the results, the processing time and/or processing resources used to obtain the results, the number, type and/or location of data collectors used in obtaining the results, accuracy of the results, comparison of results to other results, such as results obtained from different groups of collectors implementing the same and/or different instruction sets, historical records, and the like.

The machine learning processor 213 may determine from the evaluation of results obtained during the first data analytics collection period that the data analytics strategy should be changed, adjusted or otherwise refined. In response, one or more of the identification of the root collectors 205, 207 and the generation of the instruction set 202a can be changed, adjusted or otherwise refined. The learning process can be applied selectively and/or repeatedly.

The instruction sets 202a, 202b can be stored in an instruction set repository 211. The illustrative example includes an instruction database 211 that can be adapted to store and/or catalog complete instruction sets. Alternatively or in addition, the instruction database 211 can be adapted to store and/or catalog individual instruction segments and/or groups of segments. Building or otherwise maintaining an instruction repository 211 can facilitate roll outs of new instruction sets. It is envisioned that in at least some instances, instruction sets can be injected into root collectors during collection periods that occur in rapid succession. In some embodiments, the instruction sets are stored in association with additional information, such as a data collection strategy, an associated or preferred network configuration and/or condition, a ranking, an effectiveness, a measure of network loading, and so on, that can be used to differentiate between instruction sets when considered for future application. Thus, the data analytics controller 201 may choose to select a predetermined or otherwise preconfigured instruction set 202 from the instruction repository 211. Alternatively or in addition, the data analytics controller 201 may choose to generate a completely new instruction set, to modify an existing instruction set and/or to combine portions of different instruction sets.

In some embodiments, the data analytics collection system 200 includes one or more sub-collector or worker devices 209, 210. The sub-collector devices 209, 210 can be initiated, directed and/or otherwise controlled by one or more of the root collectors 207. According to the illustrative embodiment, the second root collector 207 associated with the second device 206 receives the same instruction set 202a provided to the first root collector 205 associated with the first device 203. The second root collector 207, responsive to executing respective segments of the instruction set 202a, initiates two sub-collectors 209, 210. In at least some embodiments, the second root collector 207 provides and/or injects a first sub-instruction set 214 to the first sub-collector device 209 and second sub-instruction set 215 to the second sub-collector device 210. The sub-instruction sets 214, 215 may be the same or different. The sub-collector devices 209, 210 execute their respective sub-instruction sets 214, 215 in support of data analytics collection functionality executed at the second root collector. Data analytics results obtained from the sub-collector devices 209, 210 can be passed to one or more of the second root collector 207, the data analytics processor 208 and/or the data analytics controller 201 and/or the machine learning processor 213.

In at least some embodiments, the root collectors 205, 207 and/or sub-collectors 209, 210 are implemented on virtual machines according to a software defined network (SDN) architecture. A SDN controller can be adapted to instantiate one or more of the devices 203, 206 and the root collectors 205, 207. In some embodiments the SDN controller can include functionality of the data analytics controller 201, referred to herein as a software defined collector (SDC) controller. The SDC controller can be adapted to provide distributed intelligence across network infrastructure equipment by using the common instruction set approach disclosed herein.

Beneficially, the use of a common instruction set relieves target device vendors from having to implement a proprietary approach towards data collection. Large telecommunication networks may use hundreds of different types of equipment from multiple different vendors. Without the use of the common instruction set, implementation of a data analytics collection strategy would require dealing with different interfaces, and/or different collection information, very likely in different formats based on whatever private or proprietary means a vendor might provide for a particular piece of equipment. Instead, a requirement can be levied on vendors to simply implement the common instruction set. Features of the single instruction set approach may be dictated by a network service provider, and/or determined according to adoption of an industry standard.

The single instruction set approach in lieu of proprietary data collection methods, allows for a faster innovation by manipulating what can be collected. It is foreseeable that the flexibility of the single instruction set approach would very likely extend lifecycles of equipment. Such standardization would also likely allow for improvements in observability of network operations in a cohesive manner through the instruction set refinements disclosed herein.

In some embodiments, the common instructions 202 received from the data analytics controller 201 provide the functionality to the root controller 205, 207 and or the devices 203, 207. The devices being adapted to execute respective portions of the common instructions 202. Alternatively or in addition, the common instructions 202 provide access and/or control of an equipment vendor's own collection functions. Thus, the vendor's own collection of functions may be accessed, controlled or used according to the common instructions 202. The common instructions can be applied to facilitate data analytic collection across very larger number of devices or equipment in a network, e.g., thousands or tens of thousands of devices.

Since it may not be necessary to collect information from all switches in a network, a data analytics collection strategy can identify a sample population of "check points" inside a network. For example collectors on some devices can be effectively turned off, while collectors on other devices are turned on to allow for control of a behavior of the network as a whole. In at least some embodiments, a turning on and off of the collectors can be accomplished by selectively injecting the common instructions. For example, the same instructions are injected to a selected sample set of devices, while no instruction set is injected into others. Execution of the instruction set in a data collection period is thus controlled by the injection of the instruction set.

It is envisioned that some devices and/or root collectors may not be active in a given data collection period. In some embodiments, previously injected instructions, e.g., provided in an earlier data collection period may be purged, deleted, or otherwise deactivated. In some embodiments, the data analytics controller 201 provides a deactivation command or instruction. Alternatively or in addition, instruction sets are provided with a self-termination feature, such as a time out according to a time and/or an event, such as a trigger.

In at least some embodiments the collectors 205, 207, 209, 210 can be arranged according to a multi-layer arrangement. In a multi-layer intelligent analytics arrangement, a set of software agents can be installed according software defined methods here known as "Software Defined Collectors" (SDC). T High-level, or root collectors are under control of a data analytics controller 201, but once they are instantiated, or "spun-off" and installed as agents inside or adjunct to a VNF or as physical collector node, they can be autonomous. The collectors' autonomousity are driven from the common instruction set or "DNAs" injected to them according to the SDC, e.g., by the data analytics controller 201. Some or all collectors continue to be in some measure of synchronization with their respective common instruction set for execution of functions, filter, and algorithms until a new assignment is received in the next interval. The synchronization across the root collectors 25, 207 provides a structured mesh communications among the collectors to guarantee collaboration and interworking among the collectors in atomic time. Each root collector depending on the collected events and associated instruction sets may spin off internal analytics workers, e.g., workers 209, 210 with its locally assigned instruction sets. The root collectors are ultimately responsible for their local thread actions, execute locally but adhere to multi-layer relationships that exist between the collectors.

The coordinated self-structured mesh forming collectors 205, 207, 209, 210 enable dynamic configuration of workers 209, 210 to match the instruction sets received in each collection period from a Software Defined Collector controller, e.g., the data analytics controller 201. The collectors' behaviors are tied to the SDC applications compiled from application data models. Capabilities and behaviors of the collectors 205, 207, 209, 210 can be managed via simple control APIs such as spin-up/down of collectors can be managed by higher-layer controllers. The collectors can be programed to perform functions such as synchronization of virtual probes for reporting, and or actuation, chaining of the probes for collaborative efforts.

The disclosed techniques support a unified approach for Software Defined collectors (SDC) that can span across both software VNFs as well as hardware components. The SDC can be a subset of a SDN controller which are enforcing application demands and policies for right and lite data collection analytic. Moreover, the techniques support "zero-touch" operation by way of distributed design analytics data collectors that can collaborate, load balance and create an environment for self-organizing measures, e.g., to prevent network anomalies. Local distributed collators that can act as proxy controllers and interact with SDN for dynamic instructions are the basis for adaptive probing. Consistence data collection and alarm correlation distributed across thousands of data collectors for large networks.

Figure 2B:
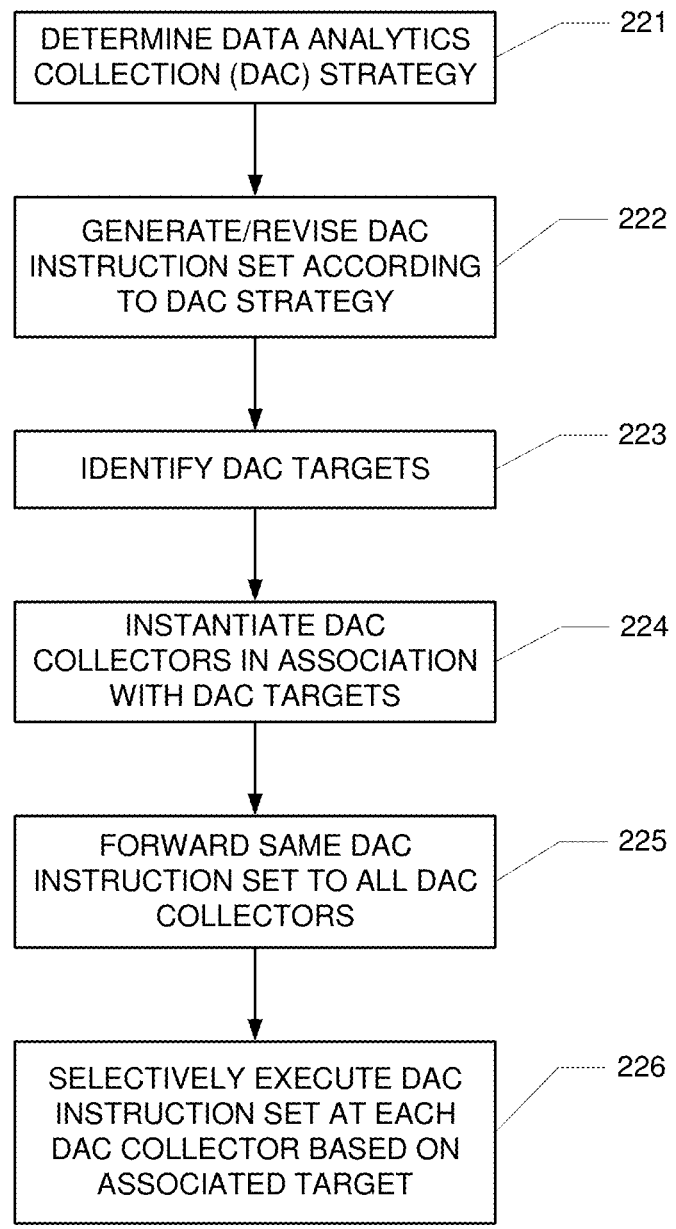
FIG. 2B depicts an illustrative embodiment of a data analytics process in accordance with various aspects described herein.

FIG. 2B depicts an illustrative embodiment of a data analytics process 220 in accordance with various aspects described herein.

A data analytics collection (DAC) strategy is identified at 221. The DAC strategy may be the result of an integrated functional network analytics (FNA) approach, e.g., according to the FNA engine 208 (FIG. 2A). Alternatively or in addition, the DAC strategy can be determined by the DAC controller 201. In at least some embodiments, the DAC strategy is initiated, defined, and/or requested by a network operator, e.g., via an operation and maintenance application and/or through an operator terminal or portal.

Having determined the DAC strategy, a common DAC instruction set is generated at 222 according to the strategy. In some embodiments, generation of the common DAC instructions includes selection of a previously determined and/or pre-stored instruction, e.g., obtained via an instruction repository 211 (FIG. 2A). Alternatively or in addition, generation of the common DAC instruction can include modification of a predetermined instruction and/or generation of a completely new common DAC instruction.

One or more DAC targets are identified at 223. Identification of the DAC targets can be determined according to an integrated FNA approach, e.g., according to the FNA engine 208, by the DAC controller 201, e.g., according to a DAC strategy initiated, defined, and/or requested by a network operator, as a result of machine learning improvements to prior collection periods, and the like.

To the extent that the DAC collectors do not already exist in association with identified DAC targets, then the DAC collectors are initiated, instantiated, or otherwise placed and/or activated at 224. For SDN applications, the DAC collectors can be instantiated in the identified target devices, as an adjunct device to the target device, or as a completely stand along device.

A common DAC instruction set including all of the same instruction segments is forwarded or otherwise injected or provided to all of the DAC collectors at 225. Each of the DAC collectors selectively execute one or more sub-segments, sections or modules of the common DAC instruction set at each DAC collector based on associated target at 226. This common instruction set, which includes the same machine readable instructions, when executed by the respective DAC collectors, results in different data analytics functionality according to the target device.

Figure 2C:
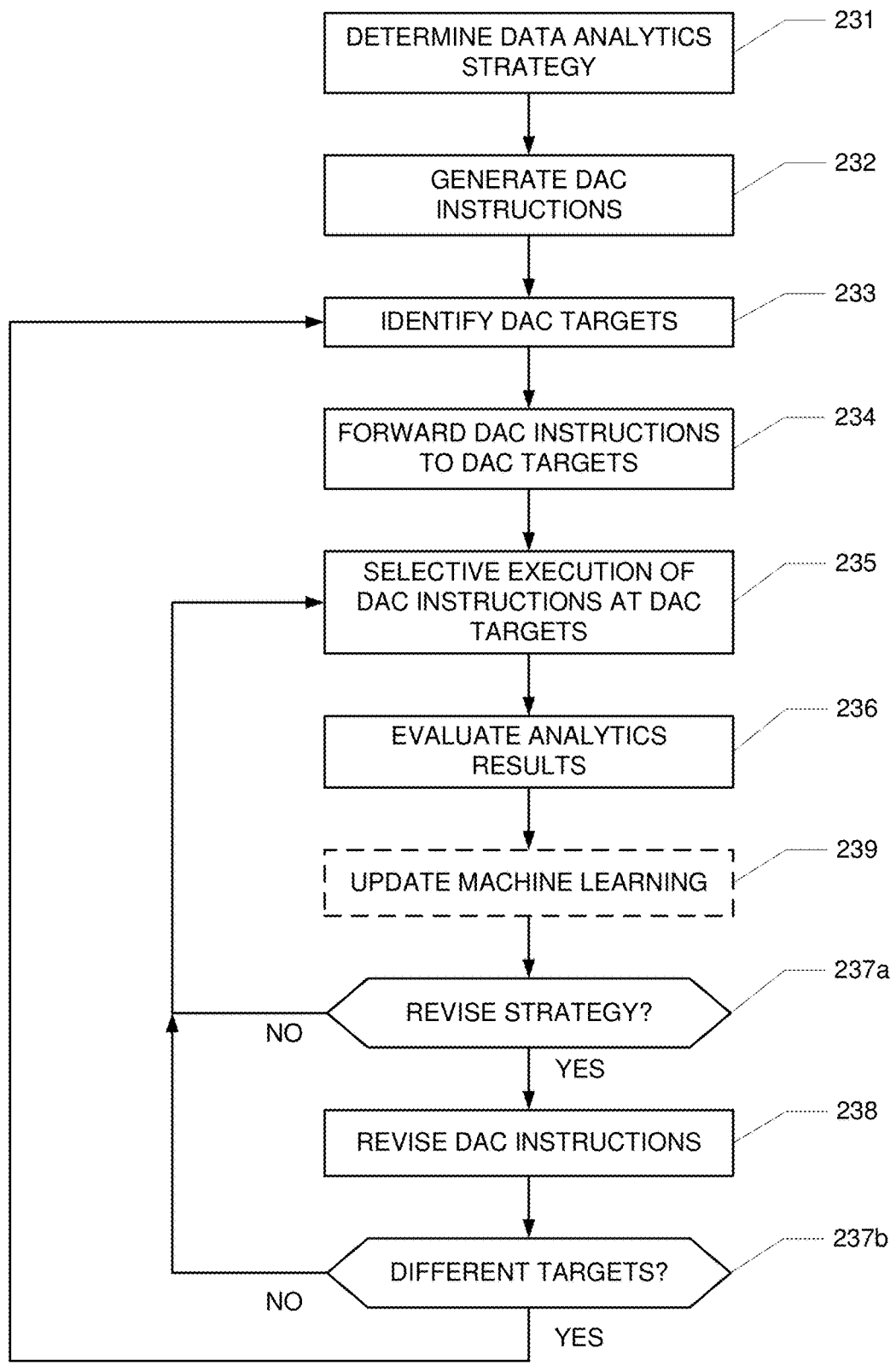
FIG. 2C depicts an illustrative embodiment of another data analytics process in accordance with various aspects described herein

FIG. 2C depicts an illustrative embodiment of another data analytics process 230 in accordance with various aspects described herein. According to the example process 230, a data analytics collection (DAC) strategy is determined at 231. A common DAC instruction set is generated at 232 according to DAC strategy. The DAC targets are identified at 233, the DAC instructions are forwarded to the DAC targets at 234, and the instructions are selectively executed at 235 according to associated target devices.

Analytics results obtained by the collectors can be provided to another device, such as a functional network analytics engine at 236. The DAC collected results can include raw collected data and/or pre-processed data obtained by a pre-processing functionality provided in the common instruction set. In some embodiments, the collected results are passed to the FNA engine via message traffic, e.g., within metadata. Alternatively or in addition, the results can be passed through dedicated messages and/or through other communication paths. For example, collected data analytics may relate to a network adapted to handle Internet data traffic, whereas the collected data analytics can be passed to the FNA engine via another network, e.g., a circuit switched network, such as plain old telephone service, or a backbone of a mobile communications network, and the like.

A determination is made at 237a as to whether the initial DAC strategy should be revised. To the extent it is determined at 237a that the strategy should not be revised, the process 230 continues at 235, by continuing with selective execution of the DAC instructions at the targets and evaluating the analytics results at 236. To the extent it is determined at 237a that the DAC strategy should be revised, a revision of the DAC instructions is obtained at 238.

A further determination is made at 237b as to whether there are any different targets associated with the revised instructions. To the extent there are no different targets, the process 230 continues at 235 by selectively executing the revised DAC instructions at the DAC targets, and evaluating analytics results at 236. To the extent it is determined at 237b that there are different targets, the process 230 continues from 233, by identifying the different DAC targets, then by selectively executing the revised DAC instructions at the different DAC targets at 235, and evaluating analytics results at 236, and so on.

In at least some embodiments, a machine learning and/or artificial intelligence can be applied at 239 (shown in phantom). The machine learning can analyze evaluations of the analytics results obtained at 236 and determine whether improvements and/or modifications should be implemented to the data analytics strategy and/or the common instruction itself.

Figure 2D:
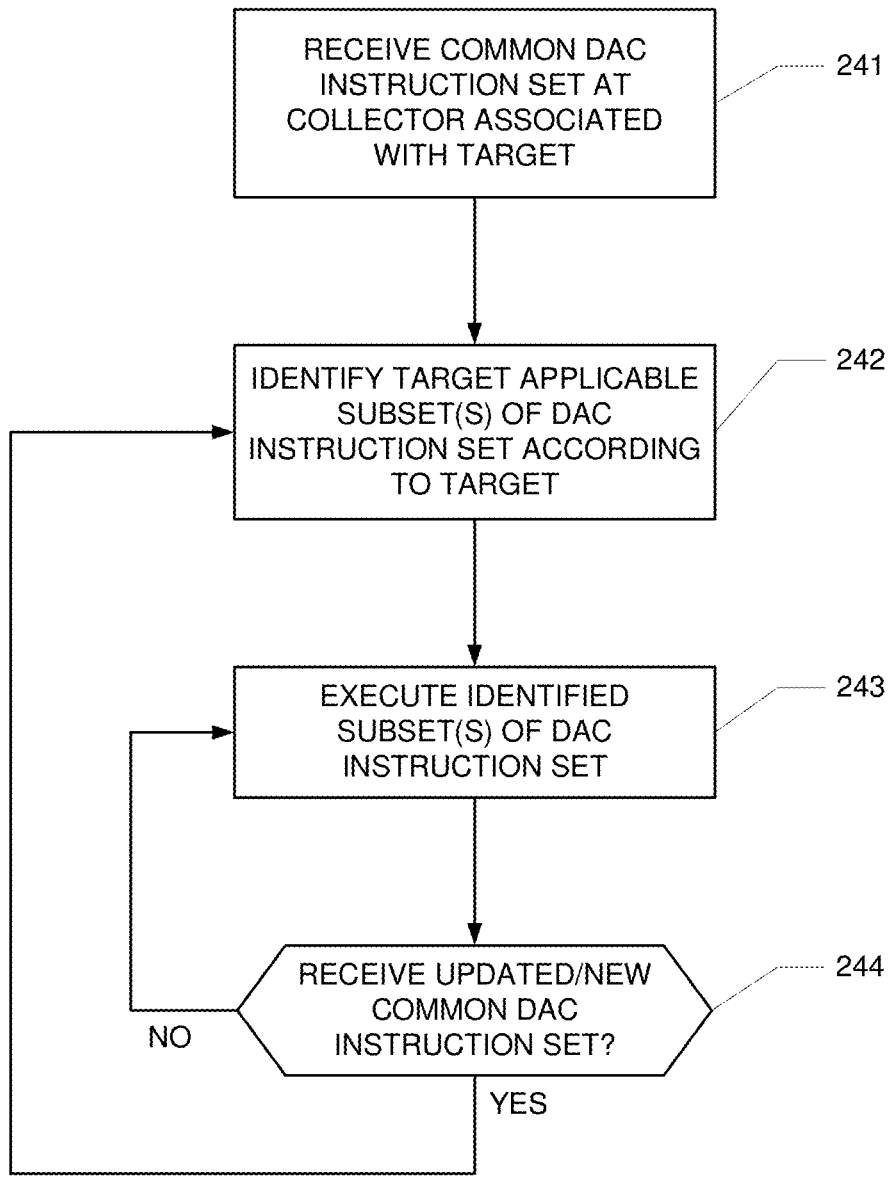
FIG. 2D depicts an illustrative embodiment of a data analytics process in accordance with various aspects described herein.

FIG. 2D depicts an illustrative embodiment of a data analytics process 240 in accordance with various aspects described herein. According to the process 240, a common DAC instruction set is received at a data analytics collector associated with target at 241. For example, the common instruction set is received at a first root collector 205 (FIG. 2A) associated with a target device, e.g., of a telecommunications network.

Depending upon the associated target device, an applicable subset(s) of DAC instruction set is identified at 242. The identified subset(s) are processed or otherwise executed by the root collector at 243. A determination is made at 244 as to whether an updated and/or new common DAC instruction set has been received. To the extent that an updated and/or new common DAC instruction set was received, the process 240 continues from 242, identifying target applicable subset(s) of updated/new DAC instruction set, according to the associated target. To the extent that an updated and/or new common DAC instruction set was not received, the process 240 continues from 243, executing the already identified subset(s) of the DAC instruction set.

It is understood that in at least some embodiments, execution of the applicable subsets of the common DAC instructions may terminate. Such terminations can be the result of expiration of a timer, an event, such as a trigger, e.g., obtaining a balanced load, reducing network congestion, reducing network errors below an error threshold, and so on.

Figure 2E:
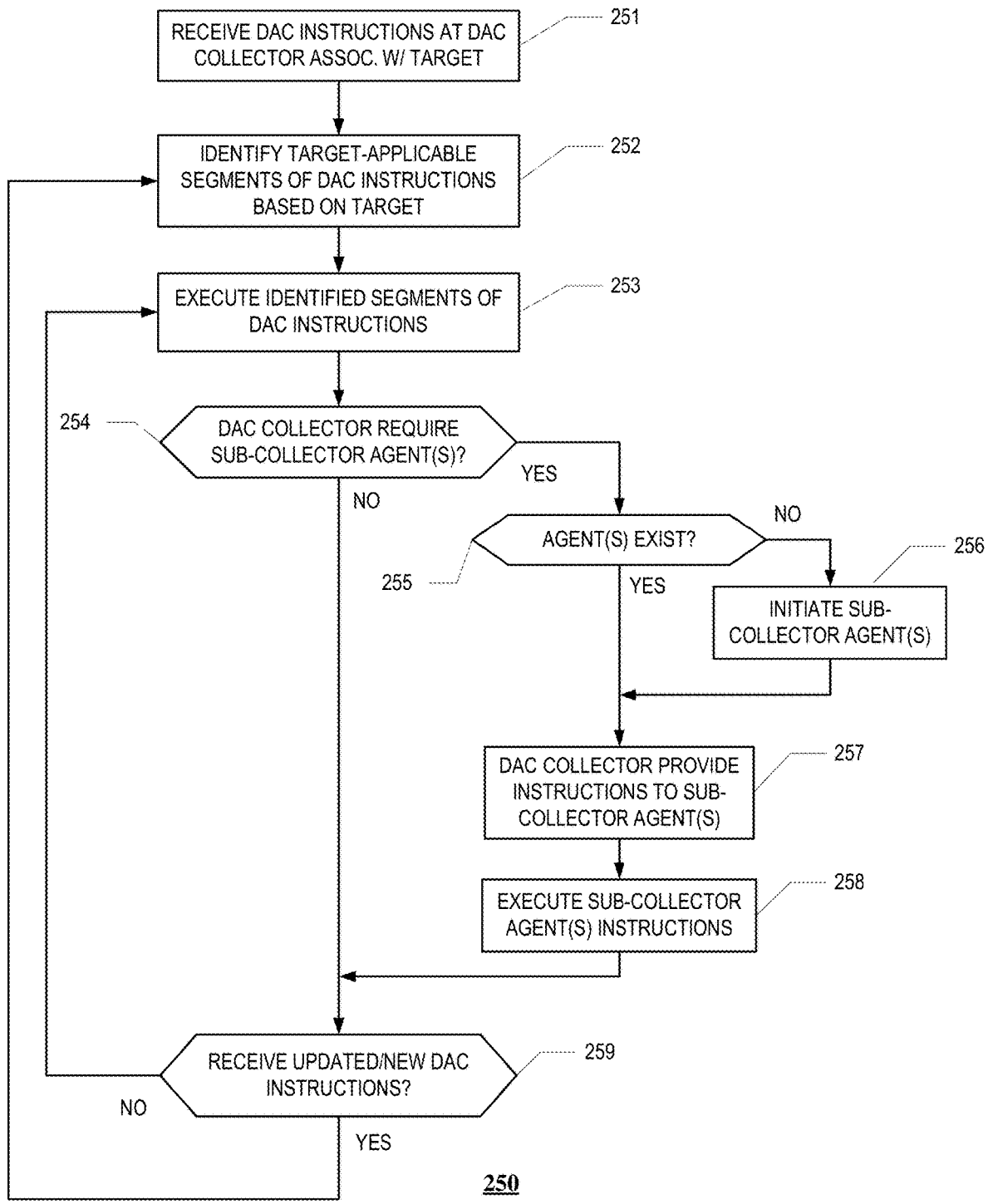
FIG. 2E depicts an illustrative embodiment of another data analytics process in accordance with various aspects described herein

FIG. 2E depicts an illustrative embodiment of another data analytics process 250 in accordance with various aspects described herein. A common or uniform DAC instruction set is received at 251 at a collector associated with a target device. A target applicable segment of the DAC instruction set is identified at 252, based on an identity of the target. The identified subset of the DAC instructions are executed at 253 at the collector associated with the target device.

A determination is made at 254 as to whether the DAC collector requires enlistment of one or more sub-collector agents. To the extent it is determined that an enlistment of one or more sub-collector agents is necessary, a further determination is made 255 as to whether any of the sub-collector agents already exists. To the extent that any of the sub-collector agents do not already exist, the sub-collector agent(s) are initiated at 256. To the extent that it is determined at 255 that the sub-collector agent(s) do already exist and/or that the sub-collector agent(s) have been initiated at 256, the process 240 proceeds according to the DAC collectors providing instructions to the sub-collector agent(s) at 257. The sub-collector agent(s), having received instructions from the DAC collector, proceed to execute the instructions at 258.

To the extent it is determined at 254 that the enlistment of one or more sub-collector agents is unnecessary, or that sub-collectors proceed to execute the instructions at 258, a determination is made at 259 as to whether updated and/or new DAC instructions were received. To the extent it is determined at 259 that updated and/or new DAC instructions were received, the process 250 continues from identifying at 252, the target-applicable segments of DAC instructions based on the target. To the extent it is determined at 259 that updated and/or new DAC instructions were not received, the process 250 continues from executing identified segments of the DAC instructions at 253.

To the extent an updated and/or new common DAC instruction set was received, continue the process 240 from 242, identifying target applicable subset(s) of DAC instruction set at 242, according to the target. To the extent an updated and/or new common DAC instruction set was not received, continue the process 240 from 243, executing identified subset(s) of the DAC instruction set.

While for purposes of simplicity of explanation, the respective processes are shown and described as a series of blocks in FIGS. 2B-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
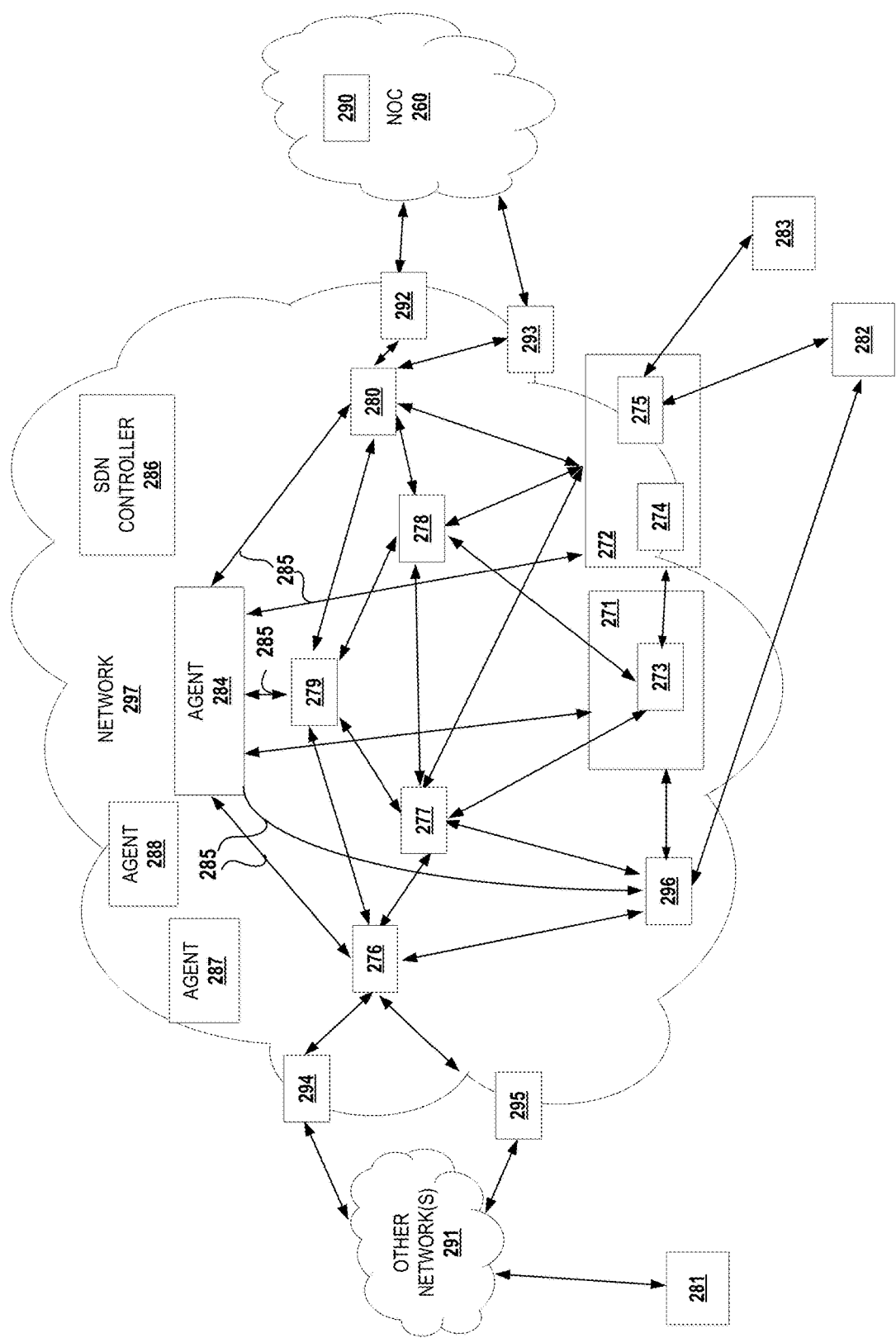
FIG. 2F is a block diagram illustrating an example, non-limiting embodiment of a system functioning within the communication network of FIG. 1 in accordance with various aspects described herein.

To further aid in understanding the present disclosure, FIG. 2F illustrates a block diagram depicting one example of a network, or system 270 suitable for performing or enabling the steps, functions, operations, and/or features described herein. The overall communications system 270 may include any number of interconnected networks which may use the same or different communication technologies. As illustrated in FIG. 2F, system 270 may include a network 297, e.g., a core telecommunication network. In one example, the network 297 may include a backbone network, or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 297 may alternatively or additional include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 297 uses network function virtualization infrastructure (NFVI), e.g., servers in a data center or data centers, or elsewhere, that are available as host devices to host virtual machines (VMs) including virtual network functions (VNFs). In other words, at least a portion of the core telecommunications network 297 may incorporate software-defined network (SDN) components.

In this regard, it should be noted that as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks. In addition, as used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions.

In one embodiment, the network 297 may be in communication with one or more other networks 291. The other networks 291 may include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, and the like. In one example, the other networks 291 may include different types of networks. In another example, the other networks 291 may be the same type of network. The other networks 291 may be controlled or operated by a same entity as that of network 297 or may be controlled or operated by one or more different entities. In one example, the other networks 291 may represent the Internet in general.

In one example, the network 297 is also in communication with a network operations center (NOC) network 289. For example, the network 297 may be operated by a telecommunications service provider. The NOC network 289 may host various operator devices, monitoring devices, and so on for use by network personnel of the telecommunications service provider in operating the network 297. For instance, device 290 may include an operator computing terminal for use by personnel in managing the network 297. In another example, device 290 may include a server hosting one or more automated network analytics applications, e.g., a "network analytics device," and may be configured to perform one or more operations or functions for generating a set of instructions in accordance with a functional network analytics platform application programming interface, in accordance with the present disclosure and as described in greater detail below. Although the NOC network 289 and the network 297 may be operated by the same entity, in one example, the NOC network 289 may include a separate domain, e.g., a separate routing domain as compared to the core telecommunications network 297. In one example, network 297 may transport traffic to and from user devices 281-283. For instance, the traffic may relate to communications such as voice telephone calls, video and other multimedia, text messaging, email, and so forth among the user devices 281-283, or between the user devices 281-283 and other devices that may be accessible via other networks 291. User devices 281-283 may include, for example, cellular telephones, personal computers, other wireless and wired computing devices, private branch exchanges, customer edge routers, media terminal adapters, cable boxes, home gateways and/or routers, and so forth.

In accordance with the present disclosure, user devices 281-283 may access network 297 in various ways. For example, user device 281 may include a cellular telephone which may connect to network 297 via other networks 291, e.g., a cellular access network. For instance, in such an example other networks 291 may include one or more cell sites, e.g., including, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 294 and 295 in network 297 may include a serving gateway (SGW), a mobility management entity (MME), or the like. In one example, user device 282 may include a customer edge (CE) router which may provide access to network 297 for additional user devices (not shown) which may be connected to the CE router. For instance, in such an example, component 296 may include a network edge device, such as a provider edge (PE) router.

As mentioned above, various components of network 297 may include VNFs which may physically include hardware executing computer-readable/computer-executable instructions, code, and/or programs to perform various functions. As illustrated in FIG. 2F, the units 274 and 275 may reside on a NFVI 272, which is configurable to perform a broad variety of network functions and services. For example, the NFVI 272 may include shared hardware, e.g., one or more host devices including line cards, central processing units (CPUs), or processors, memories to hold computer-readable/computer-executable instructions, code, and/or programs, and so forth. For instance, in one example unit 274 may be configured to be a firewall, a media server, a Simple Network Management protocol (SNMP) trap, etc., and unit 275 may be configured to be a PE router, e.g., a virtual provider edge (VPE) router, which may provide connectivity to the network 297 for the user devices 282 and 283. In one example, the NFVI 272 may represent a single computing device. Accordingly, the units 274 and 275 may physically reside on the same host device. In another example, the NFVI 272 may represent multiple host devices such that the units 274 and 275 may reside on different host devices. In one example, the unit 274 and/or unit 275 may have functions that are distributed over multiple host devices. For instance, the unit 274 and/or unit 275 may be instantiated and arranged (e.g., configured/programmed via computer-readable/computer-executable instructions, code, and/or programs) to provide for load balancing between two processors and several line cards that may reside on separate host devices.

In one example, the network 297 may also include an additional NFVI 271. For instance, the unit 273 may be hosted on the NFVI 271, which may include host devices having the same or similar physical components as the NFVI 272. In addition, the NFVI 271 may reside in a same location or in different locations from the NFVI 272. As illustrated in FIG. 2F, the unit 273 may be configured to perform functions of an internal component of network 297. For instance, due to the connections available to the NFVI 271, unit 273 may not function as a PE router, a SGW, a MME, a firewall, etc. Instead, the unit 273 may be configured to provide functions of components that do not utilize direct connections to components external to network 297, such as a call control element (CCE), a media server, a domain name service (DNS) server, a packet data network gateway (PGW), a gateway mobile switching center (GMSC), a short message service center (SMSC), etc.

In one example, the NFVI 271 and the unit 273, and the NFVI 272 and the other units 274 and 275 may also be controlled and managed by a software defined network (SDN) controller 286. For instance, in one example, the SDN controller 286 is responsible for such functions as provisioning and releasing instantiations of the VNFs to perform the functions of routers, switches, and other devices, provisioning routing tables and other operating parameters for the VNFs, and so forth. In one example, the SDN controller 286 may maintain communications with the VNFs and/or the host devices/NFVI via a number of control links which may include secure tunnels for signaling communications over an underling IP infrastructure of network 297. In other words, the control links may include virtual links multiplexed with transmission traffic and other data traversing network 297 and carried over a shared set of physical links. For ease of illustration the control links are omitted from FIG. 2F. In one example, the SDN controller 286 may also include a virtual machine operating on the NFVI/host device(s), or may include a dedicated device. For instance, the SDN controller 286 may be collocated with one or more of the VNFs, or may be deployed in a different host device or at a different physical location.

Figure 4:
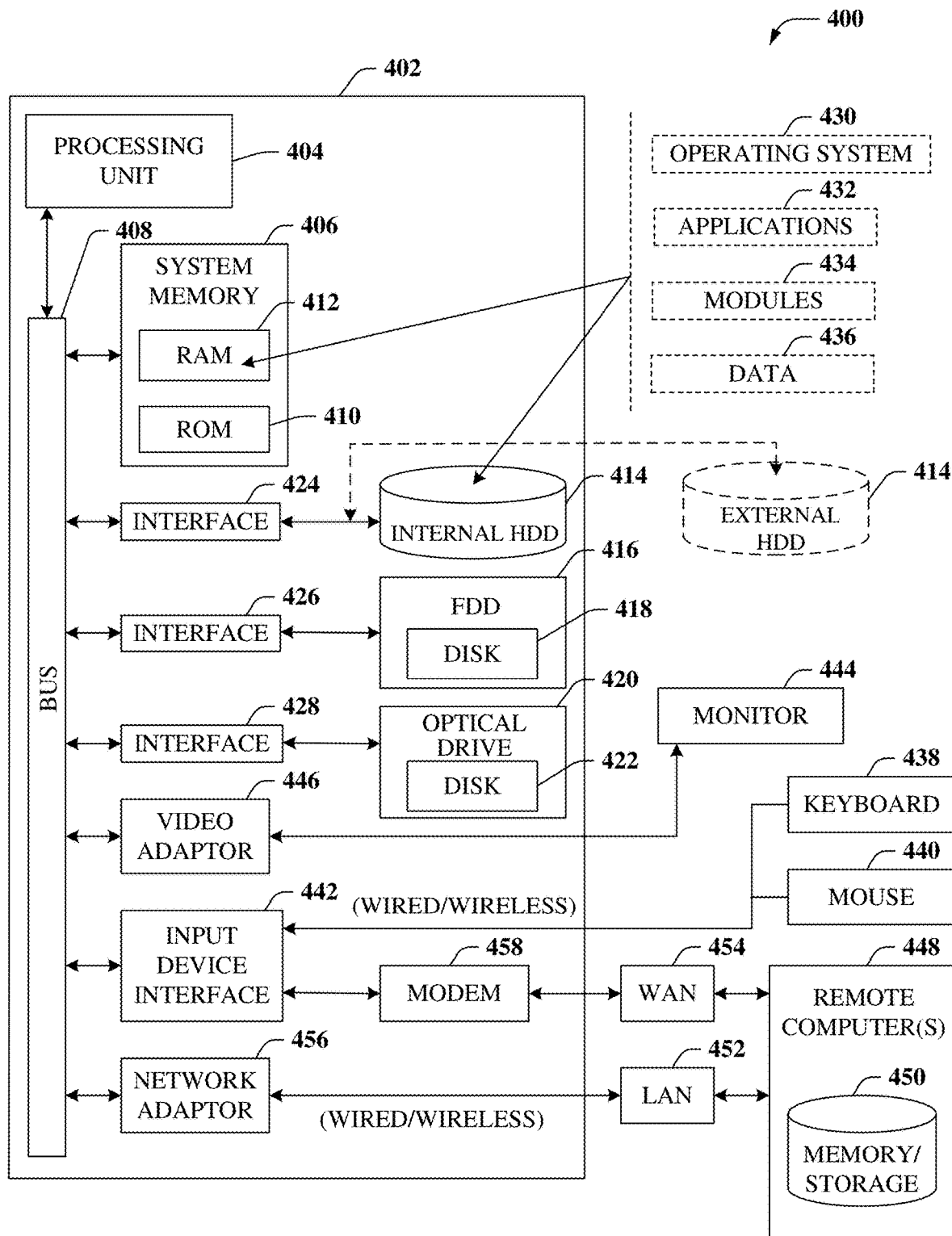
FIG. 4 is a block diagram of an example, non-limiting embodiment of a computing environment in accordance with various aspects described herein.

In one example, the SDN controller 286 may include a computing system or server, such as computing system 400 depicted in FIG. 4, and may be configured to provide one or more operations or functions in accordance with the present disclosure, such as functions of the processes 220, 230, 2340, 250 illustrated in FIGS. 2B-2E. For example, the functions of the SDN controller 286 may include the selection of an NFVI from among various NFVI available in the network 297 (e.g., the NFVI 271 or 272) to host various devices, such as routers, gateways, switches, etc., and the instantiation of such devices. For example, with respect to the units 274 and 275, the SDN controller 286 may download computer-executable/computer-readable instructions, code, and/or programs (broadly "configuration code") for the units 274 and 275 respectively, which when executed by a processor of the NFVI 272, may cause the NFVI 272 to perform as a PE router, a gateway, a route reflector, a SGW, a MME, a firewall, a media server, a DNS server, a PGW, a GMSC, a SMSC, a CCE, and so forth. In one example, the SDN controller 286 may download the configuration code to the NFVI 272. In another example, the SDN controller 286 may instruct the NFVI 272 to load the configuration code previously stored on the NFVI 272 and/or to retrieve the configuration code from another device in network 297 that may store the configuration code for one or more of the VNFs. The functions of the SDN controller 286 may also include releasing or decommissioning one or more of the unit 274 and/or the unit 275 when no longer required, the transferring of the functions of the units 274 and/or 275 to different NFVI, e.g., when the NFVI 272 is taken offline, and so on.

As illustrated in FIG. 2F, the network 297 may also include internal nodes 276-280, which may include various components, such as routers, switches, route reflectors, etc., cellular core network, IMS network, and/or VoIP network components, and so forth. In one example, these internal nodes 276-280 may also include VNFs hosted by and operating on additional NFVIs. For instance, as illustrated in FIG. 2F, internal nodes 276 and 280 may include VNFs residing on additional NFVI (not shown) that are controlled by the SDN controller 286 via additional control links. However, at least a portion of the internal nodes 276-280 may include dedicated devices or components, e.g., non-SDN reconfigurable devices. Similarly, the network 297 may also include components 292 and 293, e.g., PE routers interfacing with the NOC network 289, and the component 296, e.g., a PE router which may interface with the user device 282. For instance, in one example, the network 297 may be configured such that the user device 282 (e.g., a CE router) is dual-homed. In other words, the user device 282 may access the network 297 via either or both of the unit 275 and the component 296. As mentioned above, the components 294 and 295 may include a serving gateway (SGW), a mobility management entity (MME), or the like. However, in another example, the components 294 and 295 may also include PE routers interfacing with other network(s) 291, e.g., for non-cellular network-based communications. In one example, the components 292-296 may also include VNFs hosted by and operating on additional NFVI. However, in another example, at least a portion of the components 292-296 may include dedicated devices or components.

In one example, the network 297 further includes agent devices 284, 287, and 288. The agent devices 284, 287, and 288 may reside within the network 297 and may be made available to network analytics devices and/or applications of such network analytics devices, for performing various functions in connection with examples of the present disclosure for selecting a number of network devices to perform a number of tasks in accordance with a set of functional network analytics (FNA) instructions. In some embodiments, the agent devices 284, 287 can provide root collector functionality. Alternatively or in addition, one or more of the agent devices 284 can provide sub-collector functionality, e.g., under the control of a root collector. For example, a device 290 in the NOC network 289 may create a set of FNA instructions and may then seek to assign the set of FNA instructions to an agent device in network 297 for execution. For instance, creating a set of FNA instructions may include first generating a set of instructions in accordance with a FNA platform API. In one example, the set of instructions in accordance with the FNA platform API includes a text-based programming language script, or program that sets forth network analytics operations in accordance with the FNA platform, e.g., operations that are defined and/or permitted by the FNA platform. The set of instructions in accordance with the FNA platform API may, for example: identify at least one type of control plane data, specify a manner to collect control plane data of the at least one type of control plane data, identify a number of network devices from which to collect the control plane data, define operations to manipulate the control plane data to create resulting data, and specify at least one recipient device to receive the resulting data. Creating the set of FNA instructions may further include compiling the set of instructions in accordance with the FNA platform API into the set of FNA instructions, which may be then deployed to an agent device in network 297 for execution.

In one example, the set of FNA instructions includes a smaller data volume as compared to the set of instructions in accordance with the FNA platform API. For example, the set of FNA instructions may include a series of fields corresponding to different operations defined by the FNA platform. In one example, entries in each field of the set of fields of the set of functional network analytics instructions includes a series of computer/machine-readable alphanumeric codes representative of respective operations of the different operations defined by the FNA platform. In one example, the machine-readable alphanumeric codes are understandable to devices which are enabled in accordance with the FNA platform. For example, agent devices 284, 287, and 288 may be configured with software which enables agent devices 284, 287, and 288 to determine the type of operations and to execute the operations which are represented by the machine-readable alphanumeric codes.

In one example, the device 290 may communicate with the agent devices 284, 287, and/or 288 respectively to determine the capabilities and availability of the respective agent devices to perform the set of FNA instructions. In another example, one or more of agent devices 284, 287, and 288 may include VNFs hosted in NFVI/host device(s) of the network 297 and managed by the SDN controller 286. Accordingly, in such an example, the device 290 may communicate with the SDN controller 286 to determine the capabilities and availability of the respective agent devices 284, 287, and 288 to perform the set of FNA instructions. Alternatively, or in addition, the device 290 may instruct or request the SDN controller 286 to select any available agent device that is capable of performing the functions in accordance with the set of FNA instructions. In one example, the agent devices 284, 287, and 288 may each include a computing system or server, such as computing system 400 depicted in FIG. 4, and may be configured to provide one or more functions for selecting a number of network devices to perform a number of tasks in accordance with a set of FNA instructions, as described herein. For ease of illustration, various links between the agent devices 284, 287, and 288, and the SDN controller 286 and other links for the device 290 to communicate with such components are omitted from FIG. 2F.

For illustrative purposes, in the example of FIG. 2F, the agent device 284 may be selected by the device 290, by the SDN controller 286, and/or by the device 290 in conjunction with the SDN controller 286, to execute the set of FNA instructions. As such, various control links 285 between the agent device 284 and other components of network 297 are shown in FIG. 2F. For example, the control links 285 for the agent device 284 may similarly include secure tunnels for signaling communications over an underling IP infrastructure of network 297, e.g., virtual links multiplexed with transmission traffic and other data traversing network 297 and carried over a shared set of physical links, in a similar manner to control links between the SDN controller 286 and the various NFVI of network 297 mentioned above. In one example, the agent device 284 may be selected from among the group of agent devices 284, 287, and 288 based upon criteria such as: a location of the agent device 284, an access to one of the at least one type of control plane data, a capability of the agent device 284 to perform operations defined in the set of FNA instructions, an available processor and/or a memory capacity, and so on.

In one example, the device 290, or the device 290 via the SDN controller 286, may send the set of FNA instructions to the agent device 284 after the agent device 284 is selected. The agent device 284 may then begin performing operations in accordance with the set of FNA instructions. To illustrate, the agent device 284 may select a number of network devices to perform a number of tasks in accordance with the set of FNA instructions, send the number of tasks to the number of network devices, receive control plane data from the number of network devices in accordance with the set of FNA instructions, correlate the control plane data in accordance with the operations defined in the set of FNA instructions to create resulting data, and forward the resulting data to at least one recipient device in accordance with the set of FNA instructions.

For instance, the agent device 284 may select any one or more components of the network 297 as "worker" devices to perform tasks in accordance with the set of FNA instructions, such as the internal nodes 276-280, the components 292-296, the units 273, 274, and 275, etc. The tasks may include, for example: collecting particular types of control plane data, storing the control plane data, extracting portions of the control plane data, correlating the control plane data, anonymizing the control plane data, forwarding the control plane data to other devices, such as to the agent device 284, or to other worker devices for aggregation and forwarding to the agent device 284, and so on. In one example, the tasks may be explicitly specified in the set of FNA instructions. In another example, the agent device 284 may generate the tasks in accordance with the FNA instructions and distribute the tasks to the worker devices when generated.

In one example, the agent device 284 may select the worker devices based upon the same or similar criteria as may be used to select the agent device 284, e.g., a location of a worker device, an access of the worker device to one of the at least one type of control plane data, a capability of the worker device to perform tasks in accordance with the set of FNA instructions, an available processor and/or memory capacity, and so on. Alternatively, or in addition, worker devices may be selected based upon the worker device including a type of worker device that is specified in the set of FNA instructions. For instance, as mentioned above, the set of FNA instructions may include instructions identifying a number of network devices from which to collect the control plane data. Thus, in one example the worker devices may include such network devices, where each worker device may be tasked with collecting the control plane data passing through or generated therein.

The control plane data may relate to various communications for the user devices 281-283, or for components of the network 297, other networks 291, and so on. For instance, the control plane data may relate to: a source address or a destination address of a packet, a packet data session, etc., a source telephone number and/or a destination telephone number in a call signaling message, a packet inter-arrival time for a flow, a network link, or a component of the network 297, a packet size, a protocol utilized for a communication, an application type associated with the communication, an indication of whether a file, a service, or a storage volume is accessed, a number of requests to a server, call detail record(s), particular fields within call detail record(s), such as a call connection status, a call disposition code, etc., a number of blocked calls or dropped calls for a particular telephone number, account, trunk, switch, etc., an average signal-to-noise ratio reported by mobile endpoint devices with respect to a base station and recorded by a network-based component, and so forth. Control plane data may also include out-of-band signaling traffic (e.g., which may take a different path through the network 297 than payload traffic to which the out-of-band signaling traffic may relate), or other types of network management traffic, such as Simple Network Management Protocol (SNMP), Network Configuration Protocol (NETCONF), and ConfD flows, and the like, which may be conveyed via Telnet, Secure Shell (SSH) sessions, and the like, and which may be used to manage devices, such as to deploy configuration updates, to decommission a device, to retrieve settings and usage logs, and so on.

As mentioned above, the worker devices may collect control plane data and perform other tasks with respect to the control plane data in accordance with the FNA instructions. The tasks for the worker devices may define a manner to collect the control plane data, e.g., in accordance with instructions in the set of FNA instructions. For instance, in accordance with the FNA instructions, the task(s) for one or more worker devices may specify that a first type of control plane data should be taken from five second samples, while another type of control plane data should be taken from a one minute weighted average of continuous data. The worker devices may also send the control plane data to agent device 284, or to other worker devices for eventual forwarding to agent device 284. To illustrate, in one example, the instructions in the set of FNA instructions specifying a manner to collect the control plane data may define that worker devices are to collect the control plane data and store the control plane data until requested by the agent device 284. In another example, the instructions specifying a manner to collect the control plane data may define that a worker device is to forward the control plane data to the agent device 284 as the control plane data is generated, received or detected by the worker device.

In any case, the agent device 284 receives the control plane data from the worker devices, where the control plane data that is received may or may not have been subject to various processing via the tasks assigned to the worker devices. In one example, the agent device 284 may perform further operations with respect to the control plane data. For instance, at a minimum, the agent device 284 may correlate the control plane data received from the number of worker devices. In one example, the correlating may include segregating or grouping the control plane data by time, source and/or destination IP address, source and/or destination telephone number, area code, numbering plan area-exchange (NPA-NXX), etc.

The operations of the agent device 284 in accordance with the set of FNA instructions may further include extracting data from a selected field or fields of CDRs after the CDRs are collected, performing a hash or a similar operation to anonymize customer proprietary network information, and so forth. In one example, the worker devices and the agent device 284 may be capable of performing the same or similar operations, or tasks, with respect to the control plane data. Thus, in one example, a division of tasks/operations for manipulating or otherwise processing the control plane data may be set forth in the set of FNA instructions. For instance, tasks/operations may be allocated for execution by an agent device or by one or more of the worker devices by the network analytics application generating the set of FNA instructions. In another example, the compiling of the set of instructions in accordance with a FNA platform API may result in the automatic division of operations/tasks between an agent device and one or more worker devices. For instance, the nature of an operation defined in the set of instructions in accordance with a FNA platform API may dictate to a compiler of the FNA platform (without explicit specification by the network analytics application) whether the operation is for the agent device, or whether the operation is for assignment to, or can be assigned as a task for one or more worker devices.

The control plane data may therefore be collected by the agent device 284 and further processed via operations in accordance with the FNA instructions. As referred to herein, control plane data that has been subjected to operations by an agent device in accordance with a set of FNA instructions may be referred to as "resulting data." Continuing with the above example, the agent device 284 may send the resulting data to the device 290 when operations in accordance with the FNA instructions are completed. The agent device 284 may release any worker devices that were implicated in the performance of tasks in accordance with the set of FNA instructions. In addition, the device 290 and or the SDN controller 286 may release the agent device 284 for reassignment or for deactivation, if not needed to execute other FNA instruction sets for the same or a different requesting device. Notably, the control plane data may be collected and processed in a tiered fashion, e.g., at the worker devices, at an agent device, and at a requesting device and/or the network analytics application. This is in contrast to big data approaches in which, for example, an application may access a large volume of data collected and stored in a mass data storage platform and search through voluminous records looking for control plane data which matches one or more requesting criteria, where only a small portion of the records may actually be relevant. For instance, examples of the present disclosure are able to collect and process relevant control plane data at or near the source and as the control plane data is generated in the network. The control plane data is therefore already filtered and may be pre-processed to have greater relevance to the network analytics application when delivered.

It should be noted that the system 270 has been simplified. In other words, the system 270 may be implemented in a different form than that illustrated in FIG. 2D. For example, the system 270 may be expanded to include additional networks, such as additional NOC networks, and additional network elements (not shown) such as border elements, routers, switches, policy servers, security devices, gateways, a content distribution network (CDN) and the like, without altering the scope of the present disclosure. In addition, the system 270 may be altered to omit various elements, substitute elements for devices that perform the same or similar functions and/or combine elements that are illustrated as separate devices. For example, the agents 287 and 288 may be integrated into a single host device/NFVI. In still another example, the SDN controller 286, the agents 284, 287, and 288, and/or other network elements may include functions that are spread across several devices that operate collectively as a SDN controller, an agent device, etc. Thus, these and other modifications of the system 270 are all contemplated within the scope of the present disclosure.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of system 270, and processes 220 and 240 presented in FIGS. 1, 2A, 2B, 2C, and 2D. For example, the virtualized communication network 300 can facilitate in whole or in part a data analytics infrastructure that implements a customizable data collection strategy among a variety of different network devices and/or subsystems. In particular, implementation of the data analytics functionality is implemented by way of a common instruction set that when provided to different network devices and/or subsystems, is implemented differently, according to the target device and/or subsystem.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

The virtualized communication network 300 can include an SDN controller 381 that facilitates implementation of virtual network functionality, e.g., by instantiating, managing and/or controlling operation of virtual machines according to the virtualized network function cloud 325 and/or other cloud computing environments 375. The virtualized communication network 300 also includes a data analytics controller 382 and a functional network analytics (FNA) platform or engine 383. The data analytics controller 382 identifies a number of target devices 330, 332, 334, 350, which may include target devices utilized within one or more different access technologies 110, 130, 120, 140, 175 and initiates corresponding data analytics collectors 390a, 390b, 390c, 390d, 390e, 390f, 390g, 390h, 390i, generally 390. The data analytics controller 382 injects, forwards or otherwise provides the same instruction set to the data analytics collectors 390, which may be incorporated into and/or adjunct to the target devices. Each of the respective data analytics collectors 390 implements respective segments of the common instruction set to realize different functionality among the different collectors 390 as dictated by the associated target device.

Identification of the target devices, determination of a data analytics collection strategy, and in at least some instances, generation of the common instruction set can be performed by the FNA engine 383. For example, the FNA engine identifies a strategy. The strategy is passed to the data analytics controller that forwards the same instruction set to the appropriate data collectors 390 according to the strategy. The data analytics collectors 390, once receiving the instruction set, can operate autonomously, e.g., until the instruction set expires, is turned off, or replaced by a subsequent instruction set. Collected results can be passed to the FNA engine 383 directly and/or by way of the data analytics controller 382. In at least some embodiments, the results are passed through network message traffic according to metadata. In some embodiments, the data analytics collectors 390 can communicate with each other, e.g., according to a mesh network. In this regard, synchronization and/or harmonization resulting from injection of the common set of instructions during a common data analytics collection interval facilitates communication and/or interoperation between different data analytics collectors 390.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an infrastructure and/or process that implements a customizable data collection strategy among a variety of different devices and/or subsystems of a network. In particular, data analytics functionality is implemented by way of a common instruction set that provided to all of the different network devices and/or subsystems for which data is to be collected during a data collection interval. According to the infrastructure, the same instructions are implemented differently, according to the target device and/or subsystem.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 4, the example environment can include a computer 402, the computer 402 including a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 includes ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also include a high-speed RAM such as static RAM for caching data.

The computer 402 further includes an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, including an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can include a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically includes other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically includes many or all of the elements described relative to the computer 402, although, for purposes of brevity, only a remote memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also include a wireless AP disposed thereon for communicating with the adapter 456.

When used in a WAN networking environment, the computer 402 can include a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
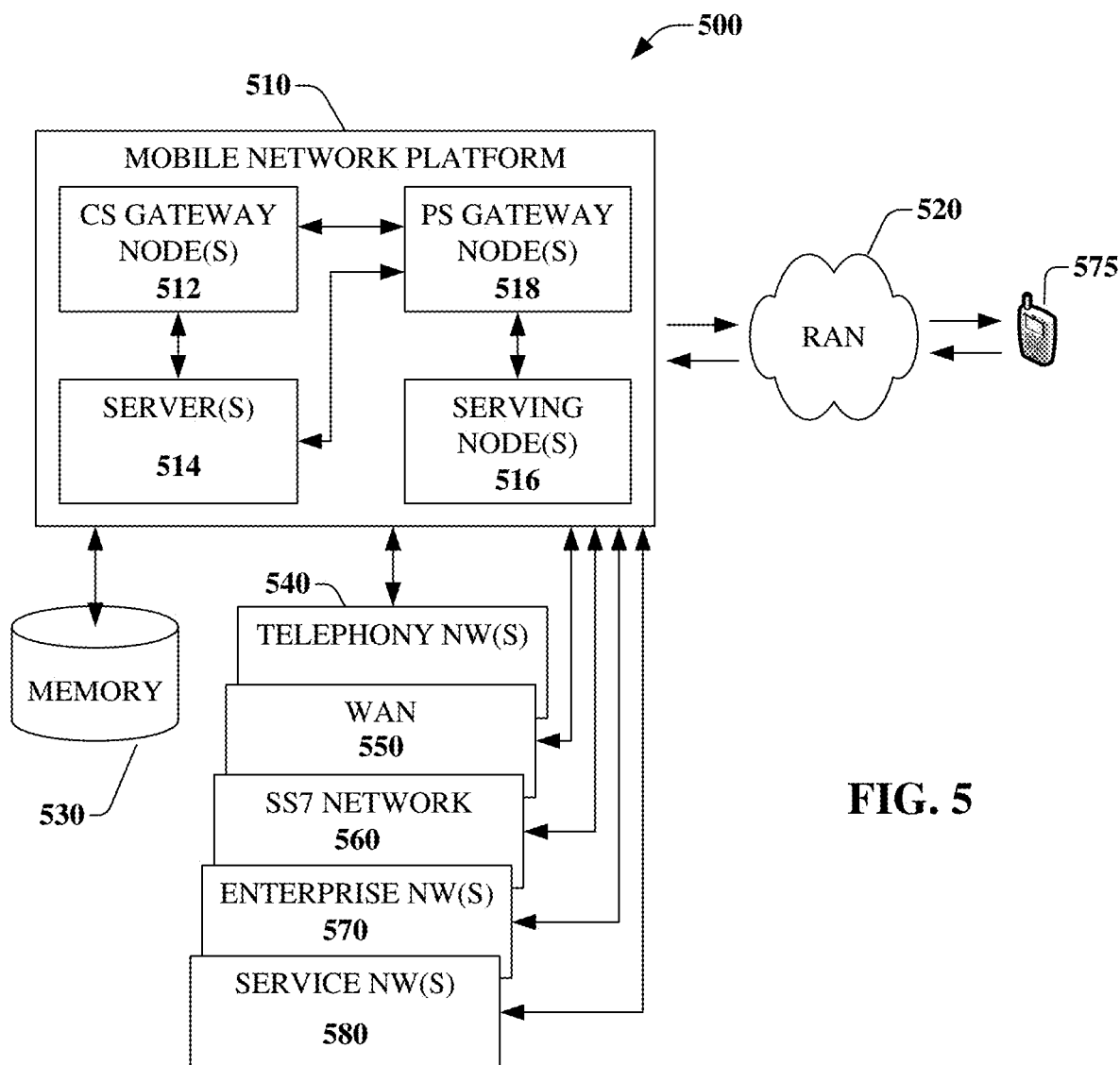
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part an infrastructure and a process that implements a customizable data collection strategy among a variety of different devices and/or subsystems of a network. In particular, data analytics functionality is implemented by way of a common instruction set that provided to all of the different network devices and/or subsystems for which data is to be collected during a data collection interval. According to the infrastructure, the same instructions are implemented differently, according to the target device and/or subsystem. In one or more embodiments, the mobile network platform 510 can generate and receive signals transmitted and received by base stations or access points such as base station or access point 122. Generally, mobile network platform 510 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 includes CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can include traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also includes serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can include utility server(s), a utility server can include a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can include one or more processors configured to confer at least in part the functionality of mobile network platform 510. To that end, the one or more processor can execute code instructions stored in memory 530, for example. It is should be appreciated that server(s) 514 can include a content manager, which operates in substantially the same manner as described hereinbefore.

In example embodiment 500, memory 530 can store information related to operation of mobile network platform 510. Other operational information can include provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

Figure 6:
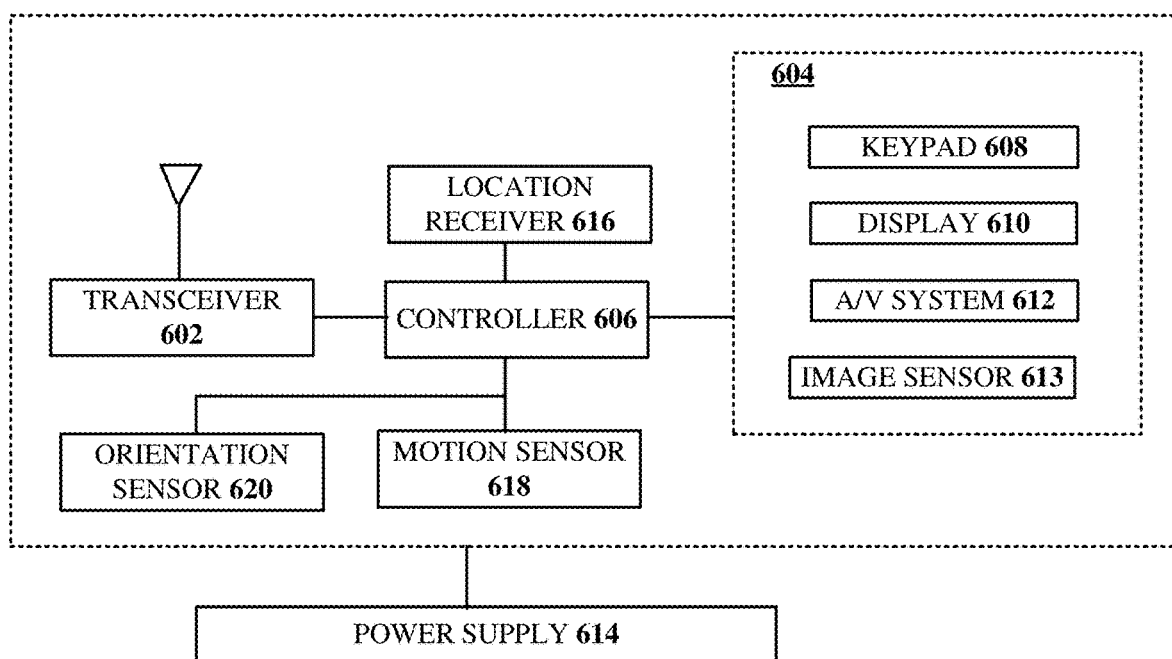
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part an infrastructure and process that implements a customizable data collection strategy among a variety of different devices and/or subsystems of a network. In particular, data analytics functionality is implemented by way of a common instruction set that provided to all of the different network devices and/or subsystems for which data is to be collected during a data collection interval. According to the infrastructure, the same instructions are implemented differently, according to the target device and/or subsystem.

The communication device 600 can include a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components including the memory. It will be appreciated that the memory components described herein can be either volatile memory or nonvolatile memory, or can include both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Although the example embodiments are directed to data analytics applications, it is understood that the techniques disclosed herein can be applied more generally, e.g., as autonomous applications, sometimes referred to as "zero touch" operations.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=\text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" or "including" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    determining, by a processing system including a processor, a data analytics collection strategy;
    generating, by the processing system, a common machine-readable instruction set according to the data analytics collection strategy;
    identifying, by the processing system, a first network device adapted to perform a first type of network function within a communications network and a second network device adapted to perform a second type of network function within the communications network, wherein the first type of network function and the second type of network function are different; instantiating, by the processing system, a first analytics collection device in association with the first network device and a second analytics collection device in association with the second network device;
    forwarding, by the processing system, the common machine-readable instruction set to the first analytics collection device and to the second analytics collection device according to a first collection period,
    wherein the first analytics collection device is adapted to autonomously execute a first group of instructions of the common machine-readable instruction set according to the first type of network function to obtain first collection results during the first collection period and the second analytics collection device is adapted to autonomously execute a second group of instructions of the common machine-readable instruction set according to the second type of network function to obtain second collection results during the first collection period, and
    wherein network analytic functions are adapted to process the first collection results and the second collection results according to the data analytics collection strategy;
    evaluating, by the processing system, the first and second collection results to obtain an evaluation of collected results; and
    determining, by the processing system, a revised data analytics collection strategy according to the evaluation of collected results.

2. The method of claim 1, wherein the instantiating of the first analytics collection device in association with the first network device comprises downloading the common machine-readable instruction set to the first analytics collection device operating within a network function virtualization infrastructure.

3. The method of claim 2, wherein obtaining of the first and second collection results comprises collecting control plane data, wherein the control plane data includes signaling traffic that facilitates an exchange of data traffic through the communications network.

4. The method of claim 3, wherein the first network device is selected from a group of network devices consisting of a router, a switch, a network edge device, a network interface card, a mobile communication device, a radio, a radio control unit, a processor of a mobile packet core network, and combinations thereof, and wherein the second network device is selected from a different group of network devices.

5. The method of claim 1, wherein the first analytics collection device comprises a virtual machine operating within a network function virtualization infrastructure and wherein the first analytics collection device is instantiated within the first network device.

6. The method of claim 1, wherein the first analytics collection device comprises a virtual machine operating within a network function virtualization infrastructure and wherein the first network device is instantiated within a physical node of the communication network.

7. The method of claim 6, wherein the physical node is adjunct to the first network device.

8. The method of claim 1, wherein the common machine-readable instruction set comprises a function, an algorithm, a filter, or a combination thereof.

9. The method of claim 1, wherein the first analytics collection device is adapted to instantiate a plurality of sub-collection devices according to the first group of instructions of the common machine-readable instruction set, wherein the sub-collection devices execute sub-instruction sets to obtain sub-collection results during the first collection period.

10. The method of claim 9, wherein execution of the sub-instruction sets are synchronized among the plurality of sub-collection devices.

11. The method of claim 1, further comprising:
revising, by the processing system, the common machine-readable instruction set to obtain a revised common machine-readable instruction set according to the revised data analytics collection strategy; and
forwarding, by the processing system, the revised common machine-readable instruction set to the first analytics collection device and the second analytics collection device according to a second collection period,
wherein the first analytics collection device is adapted to autonomously execute a first group of instructions of the revised common machine-readable instruction set according to the first type of network function to obtain subsequent first collection results during the second collection period and the second analytics collection device is adapted to autonomously execute a second group of instructions of the revised common machine-readable instruction set according to the second type of network function to obtain subsequent second collection results during the second collection period, and
wherein network analytic functions are adapted to process the subsequent first collection results and the subsequent second collection results.

12. A non-transitory, machine-readable medium, comprising executable instructions that, when executed by a processing system including a processor, facilitate performance of operations, the operations comprising:
identifying a data analytics strategy;
generating a common instruction set according to the data analytics strategy;
identifying a first network device adapted to perform a first type of network function within a communications network and a second network device adapted to perform a second type of network function within the communications network, wherein the first type of network function differs from the second type of network function;
instantiating a first analytics collector in association with the first network device and a second analytics collector in association with the second network device;
providing the common instruction set to the first analytics collector and to the second analytics collector,
wherein the first analytics collector is adapted to autonomously execute a first subset of the common instruction set according to the first type of network function to obtain first collection results and the second analytics collector is adapted to autonomously execute a second subset of the common instruction set according to the second type of network function to obtain second collection results, and
wherein network analytic functions are adapted to process the first collection results and the second collection results according to the data analytics strategy;
evaluating the first collection results or the second collection results to obtain an evaluation of collected results; and
determining a revised data analytics strategy according to the evaluation of collected results.

13. The non-transitory, machine-readable medium of claim 12, wherein the operations further comprise:
revising the common instruction set according to the revised data analytics strategy, resulting in a revised common instruction set; and
providing the revised common instruction set to the first analytics collector and the second analytics collector, wherein the first analytics collector is adapted to autonomously execute a first subset of the revised common instruction set according to the first type of network function to obtain subsequent first collection results and the second analytics collector is adapted to autonomously execute a second subset of the revised common instruction set according to the second type of network function to obtain subsequent second collection results, wherein network analytic functions are adapted to process the subsequent first collection results and the subsequent second collection results.

14. The non-transitory, machine-readable medium of claim 12, wherein obtaining of the first and second collection results by the first and second analytics collectors comprises collecting control plane data, wherein the control plane data includes signaling traffic that facilitates an exchange of data traffic through the communications network.

15. The non-transitory, machine-readable medium of claim 12, wherein the first network device comprises a virtual machine operating within a network function virtualization infrastructure.

16. A device, comprising:
a processing system including a processor; and
a memory that stores executable instructions that, when executed by the processing system, facilitate performance of operations, the operations comprising:
determining a data analytics strategy;
generating an instruction set according to the data analytics strategy;
identifying a first network device adapted to perform a first type of network function and a second network device adapted to perform a second type of network function, wherein the first type of network function differs from the second type of network function;
providing a first collector in association with the first network device and a second collector in association with the second network device;
providing the instruction set to the first collector and to the second collector,
wherein the first collector is adapted to execute a first segment of the instruction set according to the first type of network function to obtain first collection results and the second collector is adapted to execute a second segment of the instruction set according to the second type of network function to obtain second collection results, wherein the first segment of the instruction set is different from the second segment of the instruction set, and wherein a network analytic function is adapted to process the first collection results and the second collection results according to the data analytics strategy;

evaluating the first collection results and the second collection results to obtain an evaluation of collected results; and determining a revised data analytics strategy according to the evaluation of collected results.

17. The device of claim 16, wherein the first network device is instantiated within a physical collector node of a computer network.

18. The device of claim 16, wherein the instruction set comprises a function, an algorithm, a filter, or a combination thereof.

19. The method of claim 1, wherein the first group of instructions of the common machine-readable instruction set is different from the second group of instructions of the common machine-readable instruction set.

20. The non-transitory, machine-readable medium of claim 12, wherein the first subset of the common instruction set is different from the second subset of the common instruction set.

* * * * *